US007712040B2

(12) United States Patent
Aoyama

(10) Patent No.: US 7,712,040 B2
(45) Date of Patent: May 4, 2010

(54) METHOD FOR TRANSMITTING RESERVED MAIL AND INFORMATION TERMINAL DEVICE

(75) Inventor: Susumu Aoyama, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 256 days.

(21) Appl. No.: 11/373,980

(22) Filed: Mar. 14, 2006

(65) Prior Publication Data

US 2007/0053337 A1 Mar. 8, 2007

(30) Foreign Application Priority Data

Sep. 6, 2005 (JP) ............................ 2005-257796

(51) Int. Cl.
*G06F 3/048* (2006.01)
(52) U.S. Cl. ...................... 715/774; 715/772; 715/808; 715/809; 715/814
(58) Field of Classification Search ................ 715/814, 715/864, 715, 772, 774, 790–796, 808, 809
See application file for complete search history.

(56) References Cited

U.S. PATENT DOCUMENTS

| 5,796,948 | A  | * | 8/1998  | Cohen .................... 709/206 |
| 6,427,164 | B1 | * | 7/2002  | Reilly ..................... 709/206 |
| 6,714,932 | B1 |   | 3/2004  | Takeda et al. |
| 6,725,449 | B1 | * | 4/2004  | Maeda et al. ............. 717/124 |
| 2002/0042815 | A1 | * | 4/2002 | Salzfass et al. ........... 709/206 |
| 2002/0194553 | A1 | * | 12/2002 | Okamoto et al. .......... 714/699 |
| 2003/0050986 | A1 | * | 3/2003 | Matthews et al. ......... 709/206 |
| 2003/0098887 | A1 | * | 5/2003 | Li ............................ 345/809 |
| 2003/0211844 | A1 | * | 11/2003 | Omori .................. 455/414.2 |
| 2006/0095510 | A1 | * | 5/2006 | Rouse et al. .............. 709/203 |
| 2006/0135135 | A1 | * | 6/2006 | Rybak ................... 455/414.1 |
| 2006/0288283 | A1 | * | 12/2006 | Schrepp et al. ........... 715/700 |

| 2008/0222118 | A1 | * | 9/2008 | Scian et al. ............... 707/3 |

FOREIGN PATENT DOCUMENTS

| JP | 5-316144 | 11/1993 |
| JP | 2000-333256 | 11/2000 |
| JP | 2001-75894 | 3/2001 |
| JP | 2002-132669 | 5/2002 |
| JP | 2004-7144 | 1/2004 |
| JP | 2004-86329 | 3/2004 |
| JP | 2004-139280 | 5/2004 |
| JP | 2005-27198 | 1/2005 |

OTHER PUBLICATIONS

"Patent Abstracts of Japan," Japanese Patent Application Publication No. 05-316144, Publication Date: Nov. 26, 1993, Inventor: Uchihara Aki et al. [Abstract Only].
"Patent Abstracts of Japan," Japanese Patent Application Publication No. 2000-333256, Publication Date: Nov. 30, 2000, Inventor: Suzuki Takahiro [Abstract Only].
"Patent Abstracts of Japan," Japanese Patent Application Publication No. 2004-086329, Publication Date: Mar. 18, 2004, Inventor: Sekizawa Emi [Abstract Only].
"Patent Abstracts of Japan," Japanese Patent Application Publication No. 2004-139280, Publication Date: May 13, 2004, Inventor: Nakanishi Takumi [Abstract Only].
Office Action mailed Mar. 17, 2009 in corresponding Japanese Application No. 2005-257796 (2 pages) (4 pages English translation).

* cited by examiner

*Primary Examiner*—Ba Huynh

(57) ABSTRACT

When reserved mail fails to be transmitted, an error message is promptly displayed in a partial field of a display unit for a predetermined period of time. A user operates a specific key in the predetermined period of time, thereby allowing the user to return to a screen for editing the failed mail. The user can promptly take an appropriate action on the failed reserved mail.

16 Claims, 25 Drawing Sheets

METHOD FOR TRANSMITTING RESERVED MAIL AND INFORMATION TERMINAL DEVICE

BACKGROUND OF THE INVENTION

1. Field of the Invention

The present invention relates to methods for transmitting reserved mail and information terminal devices. More specifically, the present invention relates to a method for allowing reserved mail to be promptly edited when the reserved mail fails to be delivered and to an information terminal device.

2. Description of the Related Art

Information terminal devices adapted to transmit and receive messages and documents over communication networks have become widespread. There have been proposed various techniques to improve the usability for users to address the difficulty when mail transmitted from information terminal devices fails to be delivered for some reason.

In one technique, when mail fails to be delivered, an error message and the failed mail are presented to a user, and, in order to edit and re-transmit the failed mail, the user selects desired mail by comparing an ID included in the mail returned due to an address error with an ID of the transmitted mail, and edits the selected mail. This technique is disclosed in Japanese Unexamined Patent Application Publication No. 5-316144.

Another technique, called a mail reservation feature, is disclosed in Japanese Unexamined Patent Application Publication No. 2000-333256. In this technique, mail created in an out-of-service area, such as a subway train, is automatically transmitted when the mail enters an in-service area.

In the information terminal devices of the related art, when mail fails to be delivered, a transmission error message and the failed mail are presented to the users. The users are therefore informed of non-delivery of the transmitted mail.

However, there is no disclosure of a technique for, in a case where some other application is active, promptly notifying the users of a transmission error while the application is still active. Thus, a problem occurs in that it is difficult for users to promptly take an appropriate action of modifying the mail text, re-entering an address, or the like when some other application is running.

Another problem is that since the transmission error message and the failed mail are presented to users, it is difficult for the users who are engaged in some other task in the foreground to continue the ongoing task, thereby interrupting it.

SUMMARY OF THE INVENTION

In order to overcome the problems with the related art, it is an object of the present invention to provide an arrangement for promptly displaying a transmission error message in a partial field on a display screen for a certain period of time when reserved mail fails to be delivered and allowing a user to return to an editing screen by operating a specific key for a period of time during which the transmission error message is displayed in the partial field so that the user can promptly edit the failed reserved mail on the editing screen. This arrangement enables the user to easily take an appropriate action on the failed reserved mail without performing any time-consuming operation. The keys other than the operated specific key are available for a task being performed, and the ongoing task is not interrupted.

According to an aspect of the present invention, an information terminal device having a function for reserving mail includes an operation unit including a specific key, a communication unit, an error detecting unit that detects a transmission error when the reserved mail fails to be transmitted, a display unit having a partial field in which a transmission error message is displayed, a unit that displays the transmission error message in the partial field for a predetermined period of time, and a controller that performs control so as to change to an editing screen for editing the failed reserved mail when the specific key of the operation unit is operated in a period of time during which the transmission error message is displayed in the partial field. Thus, when reserved mail that fails to be transmitted is to be edited, the user operates a specific key in a period of time during which a transmission error message is displayed, thereby allowing the user to promptly return to an editing screen. The information terminal device therefore allows the user to easily take an appropriate action on the failed reserved mail without performing any time-consuming operation.

The controller may allow the transmission error message to be displayed in the partial field, and the partial field may be displayed by modifying a portion of an operation field showing a view for an ongoing task. The user can therefore know that the reserved mail fails to be delivered. When the failed reserved mail is to be edited, the user operates a specific key in a certain period of time, thereby allowing the user to promptly return to an editing screen. The information terminal device therefore allows the user to easily take an appropriate action on the failed reserved mail without performing any time-consuming operation.

The controller may allow the transmission error message to be displayed in the partial field, and a side of the partial field may be adjacent to a side of an operation field showing a view for an ongoing task. Since the partial field in which the transmission error message is displayed is separated from the operation field for the task being performed by the user, the user who is engaged in some other task in the foreground can know that the reserved mail fails to be delivered without interrupting the ongoing task.

The controller may allow the transmission error message to be displayed in the partial field, and a bottom side of the partial field may be adjacent to a top side of an operation field showing a view for an ongoing task. Therefore, if the user is engaged in some other task in the foreground, the user can know that the reserved mail fails to be delivered without interrupting the ongoing task.

The controller may allow a non-delivery message, error details, or a combination of the non-delivery message and the error details to be displayed in the partial field. Therefore, if the user is engaged in some other task in the foreground, the user can be informed of non-delivery of the reserved mail, the error details, or a combination of the non-delivery and the error details without interrupting the ongoing task.

When the failed reserved mail is re-transmitted, the controller may allow a message indicating re-transmission of the reserved mail to be displayed in the partial field, a bottom side of the partial field being adjacent to the top side of the operation field. Since the partial field in which the message indicating re-transmission of the reserved mail is displayed is separated from the operation field for the task being performed by the user, the user who is engaged in some other task in the foreground can know that the reserved mail has been re-transmitted without interrupting the ongoing task.

The operation unit may at least include a set key, and the specific key may be the set key. Therefore, the user is only required to operate the set key to allow the user to return to the editing screen for editing the failed reserved mail.

The specific key may be a key that is not associated with an ongoing task. Therefore, if the user is engaged in some other task in the foreground, the specific key is not associated with the ongoing task, and the specific key can be operated to allow the user to return to the editing screen for editing the failed reserved mail without affecting the ongoing task.

The controller may allow normal transmission or reserved transmission to be selected after changing to the editing screen for editing the reserved mail. Therefore, the user can select normal transmission or reserved transmission to retransmit the failed reserved mail.

According to another aspect of the present invention, a portable telephone device having a function for reserving mail includes an operation unit including a specific key, a communication unit, an error detecting unit that detects a transmission error when the reserved mail fails to be transmitted, a display unit having a partial field in which a transmission error message is displayed, a unit that displays the transmission error message in the partial field for a predetermined period of time, and a controller that performs control so as to change to an editing screen for editing the failed reserved mail when the specific key of the operation unit is operated in a period of time during which the transmission error message is displayed in the partial field. Thus, when reserved mail that fails to be transmitted is to be edited, the user operates a specific key in a period of time during which a transmission error message is displayed, thereby allowing the user to promptly return to an editing screen. The portable telephone device therefore allows the user to easily take an appropriate action on the failed reserved mail without performing any time-consuming operation.

According to another aspect of the present invention, a program for editing reserved mail causes the above-described information terminal device to execute an error detecting step of detecting a transmission error when the reserved mail fails to be transmitted, a step of displaying a transmission error message in a partial field in the display unit, a step of displaying the transmission error message in the partial field for a predetermined period of time, and a step of changing to an editing screen for editing the failed reserved mail when the specific key of the operation unit is operated in a period of time during which the transmission error message is displayed in the partial field. Thus, when reserved mail that fails to be transmitted is to be edited, the user operates a specific key in a period of time during which a transmission error message is displayed, thereby allowing the user to promptly return to an editing screen. The program therefore allows the user to easily take an appropriate action on the failed reserved mail without performing any time-consuming operation.

According to another aspect of the present invention, a method for editing reserved mail in the above-described information terminal device includes an error detecting step of detecting a transmission error when the reserved mail fails to be transmitted, a step of displaying a transmission error message in a partial field in the display unit, a step of displaying the transmission error message in the partial field for a predetermined period of time, and a step of changing to an editing screen for editing the failed reserved mail when the specific key of the operation unit is operated in a period of time during which the transmission error message is displayed in the partial field. Thus, when reserved mail that fails to be transmitted is to be edited, the user operates a specific key in a period of time during which a transmission error message is displayed, thereby allowing the user to promptly return to an editing screen. The method therefore allows the user to easily take an appropriate action on the failed reserved mail without performing any time-consuming operation.

According to the present invention, therefore, when reserved mail fails to be delivered, an error message is promptly displayed in a partial field of a display unit for a predetermined period of time. A user operates a specific key in the period of time during which the error message is displayed in the partial field, thus allowing the user to return to a screen for editing the failed reserved mail. Thus, the user can easily take an appropriate action on the failed reserved mail without performing any time-consuming operation. The keys other than the operated specific key are available for a task being performed, and the ongoing task is not interrupted.

DESCRIPTION OF THE PREFERRED EMBODIMENTS

Embodiments of the present invention will be described below with reference to the drawings. An information terminal device according to an embodiment of the present invention will be described in the context of a portable telephone device.

Figure 1:
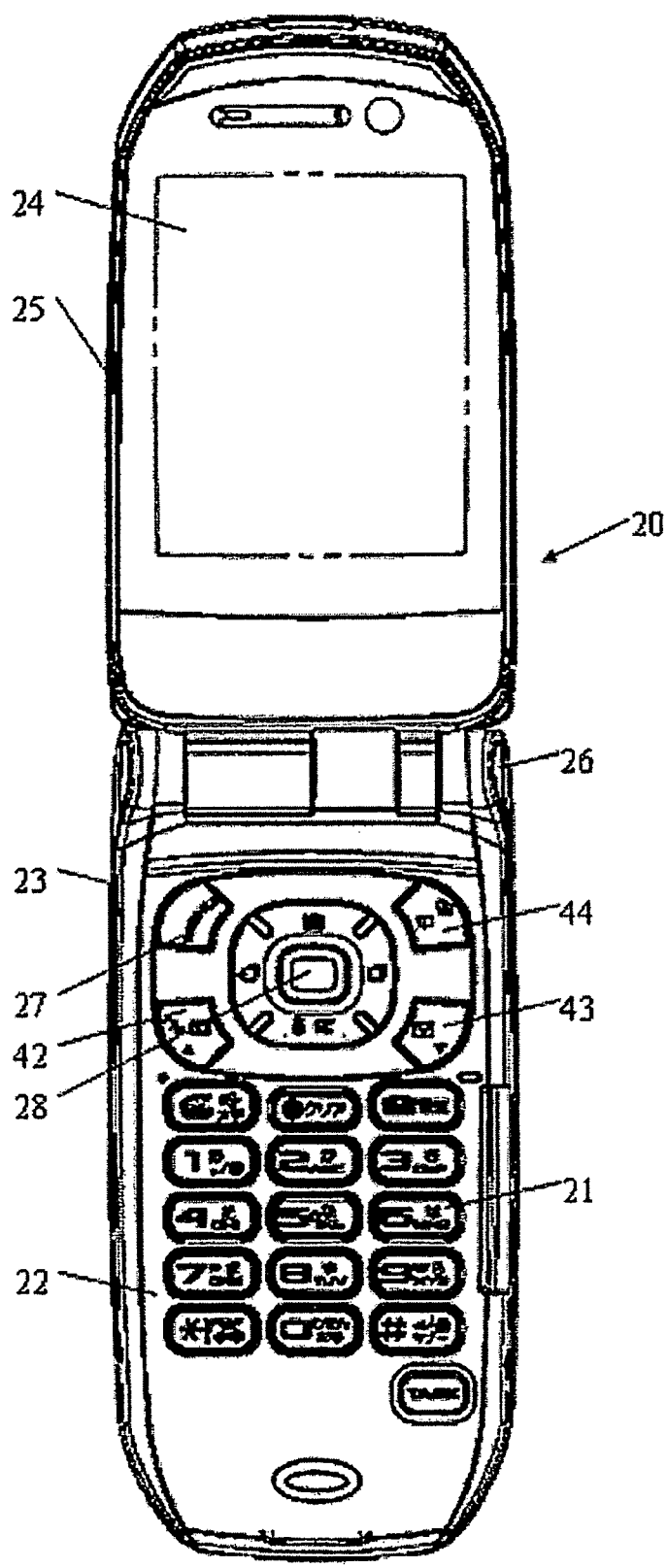
FIG. 1 is an external view of a portable telephone device according to an embodiment of the present invention.

FIG. 1 is an external view of an exemplary portable telephone device 20. The portable telephone device 20 includes an operation section 23 and a display section 25. The operation section 23 includes a main operation unit 22 having a plurality of key buttons 21, function keys 27, 42, 43, and 44, a set key 28, and a moving shaft 26 at an end of the operation section 23. The display section 25 is movable (or foldable) via the moving shaft 26, and includes a main display 24. The portable telephone device 20 is opened so that the main operation unit 22 is ready to operate and the main display 24 is viewable, and the portable telephone device 20 is closed or folded like a closed shell so that the main operation unit 22 and the main display 24 face each other so as to be isolated from the outside.

The portable telephone device 20 is separable into the operation section 23 and the display section 25 with the moving shaft 26 therebetween. The moving shaft 26 connects the operation section 23 and the display section 25 to allow the portable telephone device 20 to be folded. The key buttons 21 are used to enter telephone numbers, characters, etc. The function keys 27, 42, 43, and 44 are operated to display a menu screen, change the screen to a mail creation screen, and so forth. The set key 28 is used to select a menu key on the menu screen and so forth. The main operation unit 22 is a generic name including the key buttons 21, the function keys 27, 42, 43, 44, and the set key 28. The operation section 23 is a generic name including the main operation unit 22. The main display 24 displays the time and date and information comments or transmission or received mail including text and images. The display section 25 is a generic name including the main display 24.

Figure 2:
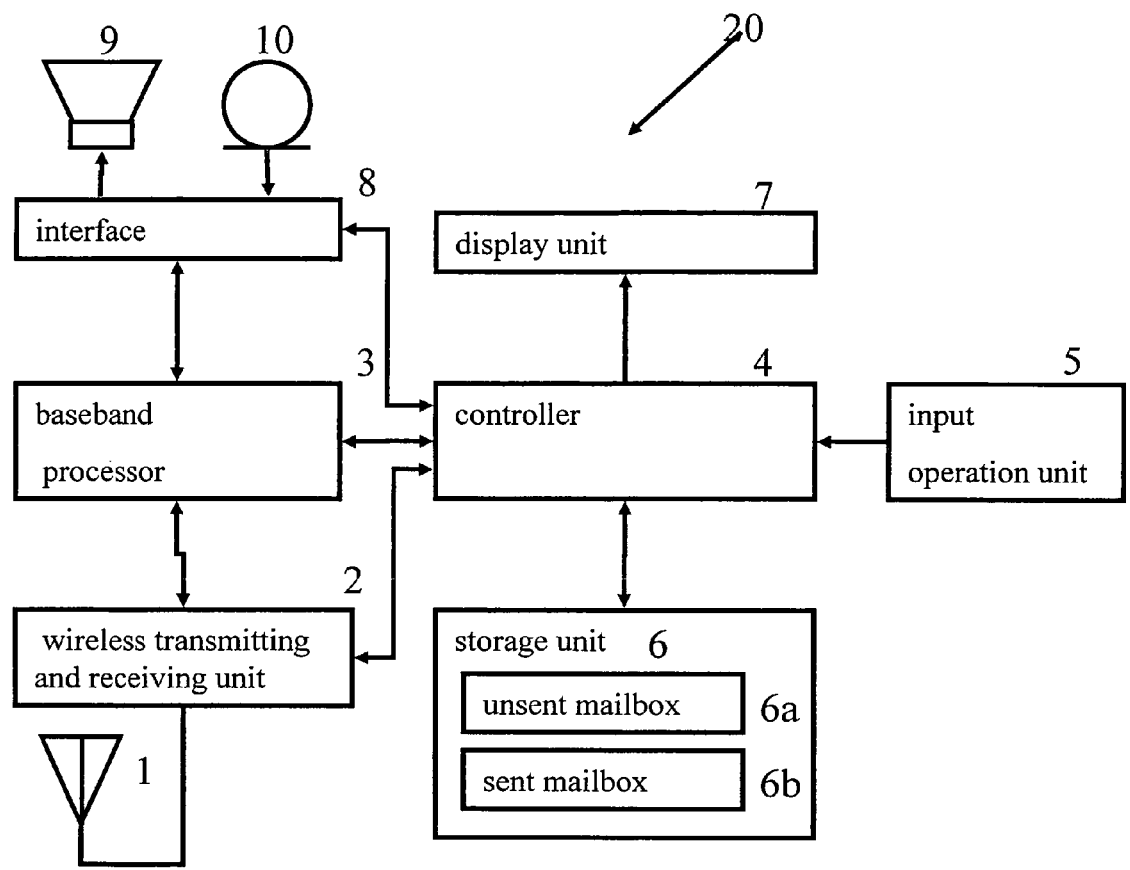
FIG. 2 is a block diagram schematically showing an example hardware configuration of the portable telephone device according to the embodiment of the present invention.

FIG. 2 is a block diagram schematically showing an example hardware configuration of the portable telephone device 20. The portable telephone device 20 shown in FIG. 2 includes a wireless transmitting and receiving unit 2 having an antenna 1, a baseband processor 3, an input operation unit 5 used by the user to input telephone numbers and information by operating keys, a storage unit 6 including an unsent mailbox 6a and a sent mailbox 6b, a display unit 7, and a controller 4. The wireless transmitting and receiving unit 2, the baseband processor 3, the input operation unit 5, the storage unit 6, and the display unit 7 are connected to the controller 4. A loudspeaker 9 and a microphone 10 are also connected to the controller 4 via an interface (IF) 8. The input operation unit 5 includes the various keys on the operation unit 22 shown in FIG. 1.

The basic functions of the portable telephone device 20 including a calling function, a function for transmitting and receiving data, and a display function are similar to those of a typical portable telephone device. The wireless transmitting and receiving unit 2 includes a radio-frequency modulator supporting a digital system, such as the Personal Digital Cellular (PDC) system, and has a function for wirelessly transmitting and receiving data to and from a base station (not shown) or a communication device, such as another portable telephone device, via the antenna 1.

The baseband processor 3 processes an audio signal transmitted to or received from the loudspeaker 9 or the microphone 10 via the IF 8, data in accordance with the transmission and reception format, text data and image data, or the like, and transfers the text data and image data to the controller 4. The wireless transmitting and receiving unit 2 and the baseband processor 3 implement a transmitting and receiving function unit.

The controller 4 has a configuration including a microprocessor, and controls the respective components. For example, in response to input information from the input operation unit 5 using keys, e.g., the key buttons 21, the function keys 27, 42, 43, and 44, and the set key 28, the controller 4 controls network access based on a dialed number, registration of various types of information in the storage unit 6, selection of an item displayed on the display unit 7, or the like.

The storage unit 6 stores various programs for controlling transmission and reception, transmission of reserved mail messages, and so forth. The unsent mailbox 6a and the sent mailbox 6b of the storage unit 6 are storage areas for transmitted and received mail.

The display unit 7 may be implemented by a liquid crystal panel, and displays the time and date and information comments or transmission or received mail including text and images. The controller 4 and the programs stored in the storage unit 6 implement the functions for registering the name of the user, registering personal data relating to the user and the communication party, and transmitting reserved mail.

Figure 3:
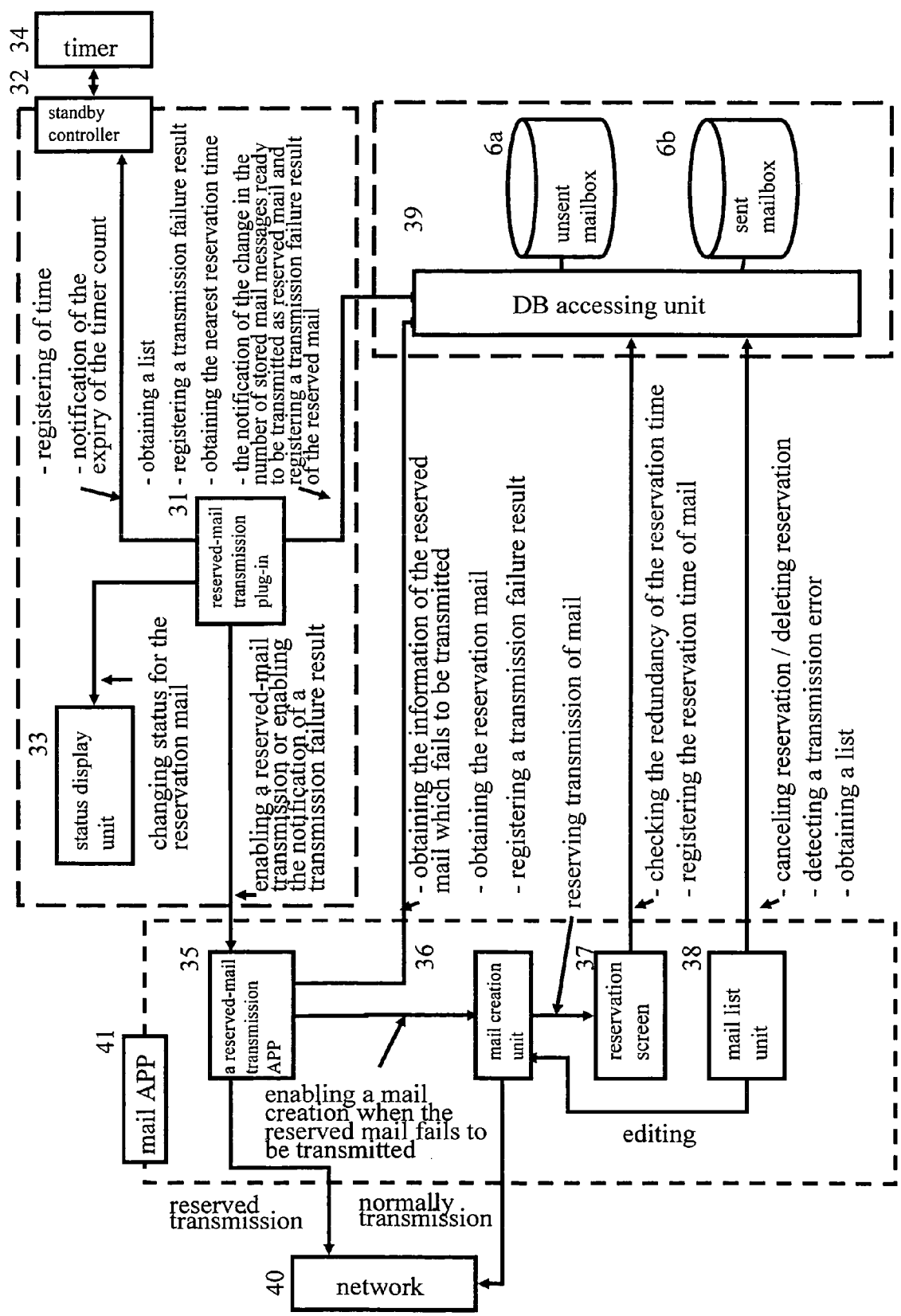
FIG. 3 is a block diagram schematically showing a function for controlling reserved mail.

FIG. 3 shows a function for controlling transmission of reserved mail. This function is implemented by a timer 34, which is a function of an operating system (OS), or a program for transmitting reserved mail, which is an application program, to transmit mail via a network 40.

A mail APP 41 includes a reserved-mail transmission APP 35, a mail creation unit 36, a reservation screen 37, and a mail list unit 38, and has functions for transmitting mail, creating mail, and so forth. The reserved-mail transmission APP 35 is enabled when it is invoked by a reserved-mail transmission plug-in 31. The reserved-mail transmission APP 35 has functions for transmitting reserved mail, registering and sending a transmission result, sending a message indicating that reserved transmission fails, and invoking reserved mail that fails to be transmitted for editing. The mail creation unit 36 has functions for normally transmitting mail, and reserving transmission of mail on the reservation screen 37. The reservation screen 37 has functions for checking the redundancy of the reservation time, and registering the reservation time of mail. The mail list unit 38 has functions for displaying a list of normal unsent mail messages and mail messages that are ready for reserved transmission, detecting a transmission error, canceling transmission reservation, and deleting reserved mail. The reserved mail transmitted from the reserved-mail transmission APP 35 and the normal mail transmitted from the mail creation unit 36 are delivered to the other party via the network 40.

A DB accessing unit 39 has functions for accessing the unsent mailbox 6a to store a registered reserved mail message in the unsent mailbox 6a, and notifying the reserved-mail transmission plug-in 31 of a change in the number of stored mail messages ready to be transmitted as reserved mail. The DB accessing unit 39 also has a function for accessing the sent mailbox 6b to store a sent mail message in the sent mailbox 6b.

A standby controller 32 is enabled as long as the terminal device is turned on and operating if the terminal device is folded or closed. The standby controller 32 has a function for notifying the reserved-mail transmission plug-in 31 of the boot-up of the terminal device at the same time when the terminal device is turned on. This function is implemented by using the timer 34 to notify the reserved-mail transmission plug-in 31 of the arrival of the reservation time. The reserved-mail transmission plug-in 31 has functions for obtaining the reserved mail having the nearest reservation time from the DB accessing unit 39 in response to the notification of the boot-up of the terminal device from the standby controller 32, registering the reservation time of the obtained reserved mail in the standby controller 32, and invoking the reserved-mail transmission APP 35 in response to the notification of the arrival of the reservation time from the standby controller 32. The reserved-mail transmission plug-in 31 also has functions for obtaining the reserved mail having the nearest reservation time from the DB accessing unit 39 in response to the notification of the boot-up of the terminal device from the standby controller 32, and registering a transmission failure result of the reserved mail in the DB accessing unit 39 when the reservation time of the obtained reserved mail has passed. A status display unit 33 has a function for displaying a reserved-mail icon on reserved mail in the list of unsent mail messages in response to the notification of the change in the number of stored mail messages ready to be transmitted as reserved mail messages from the reserved-mail transmission plug-in 31.

Figure 4A:
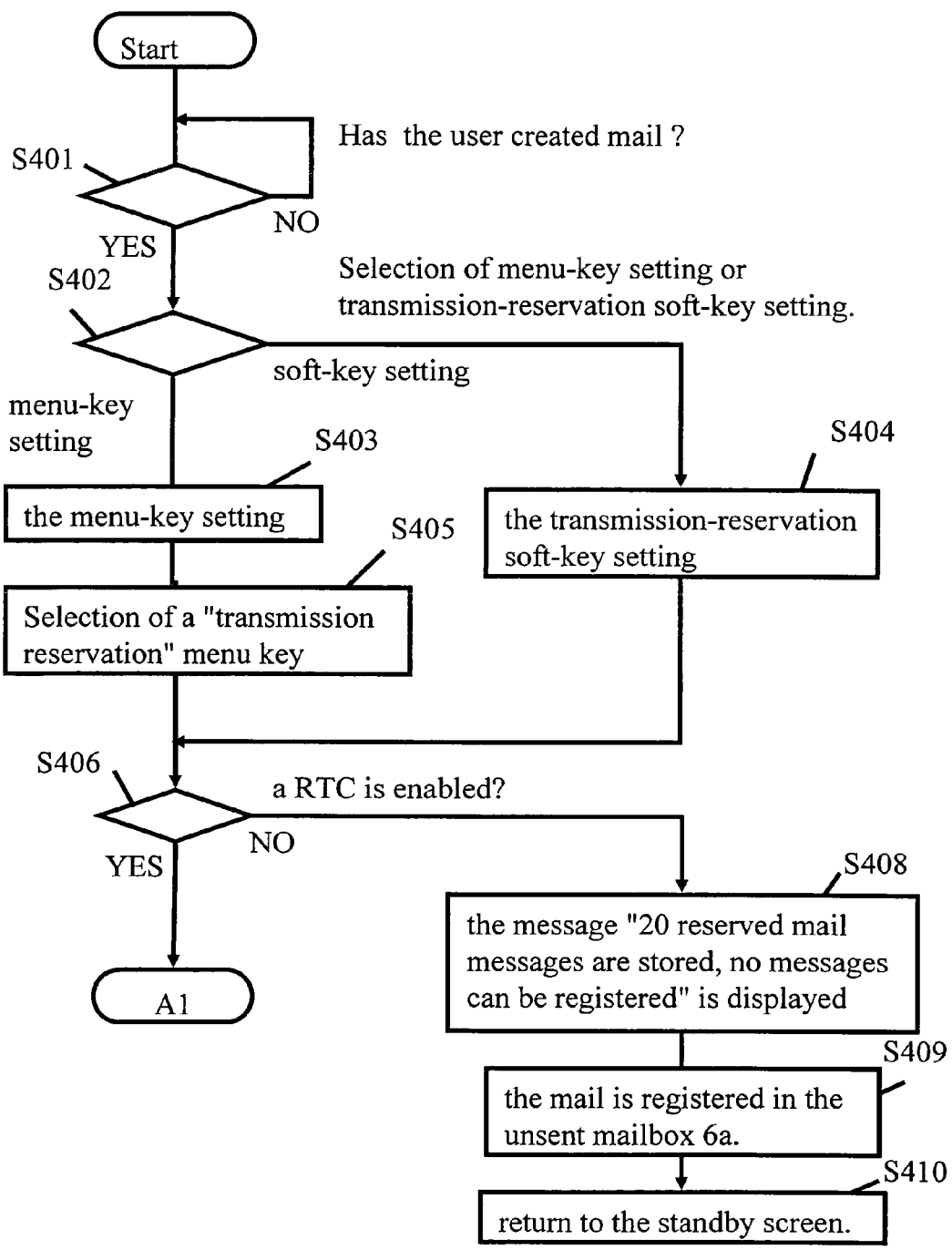
FIG. 4A is a flowchart showing a process for registering reserved mail according to an embodiment of the present invention.
Figure 4B:
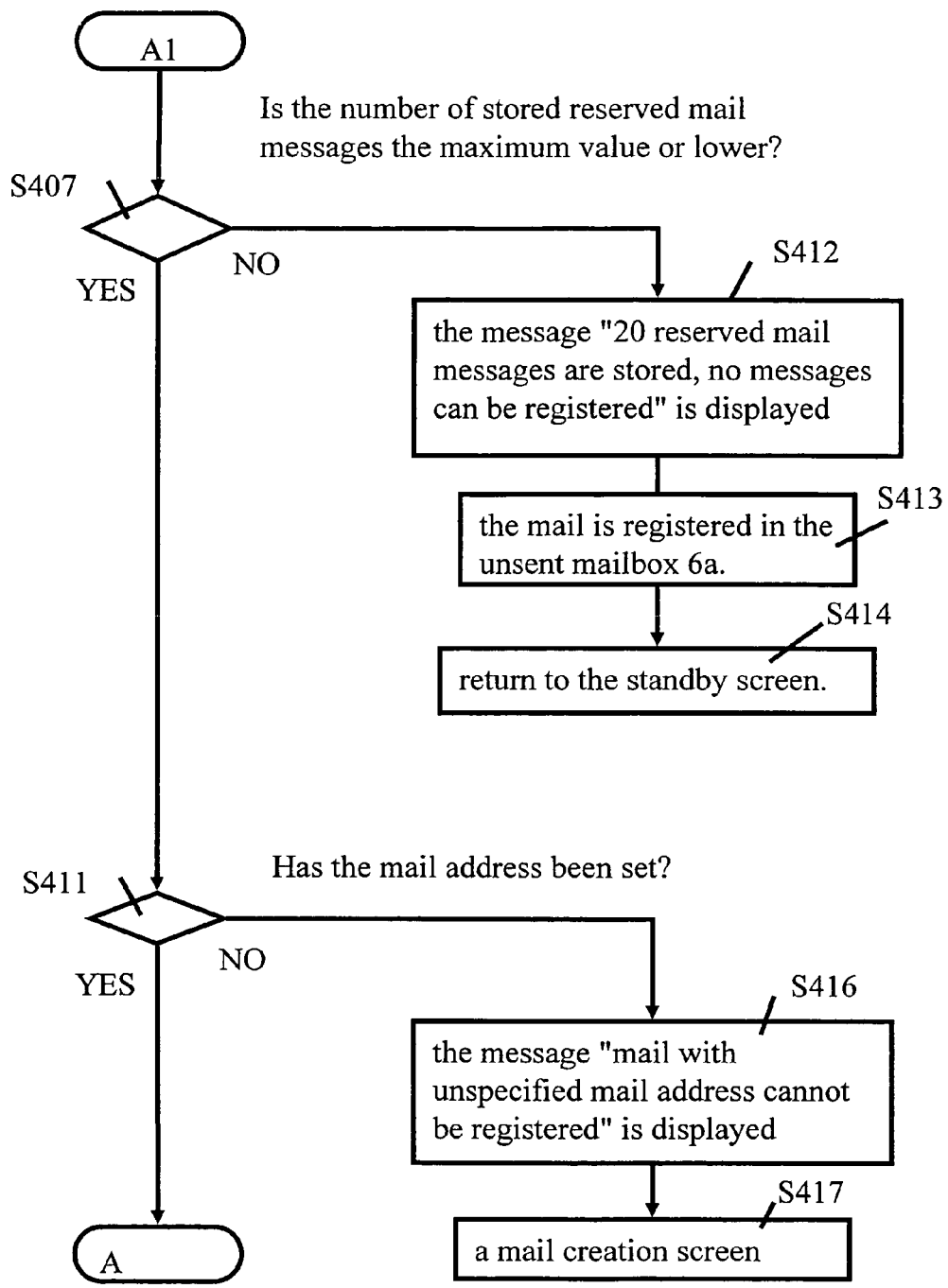
FIG. 4B is a flowchart showing a process for registering reserved mail according to an embodiment of the present invention.

A process for registering reserved mail will be described with reference to FIG. 4A and FIG. 4B.

In step S401, the mail creation unit 36 determines whether or not the user has created mail. If this determination is affirmative, the flow proceeds to step S402. If the determination is negative, the flow returns to step S401. In the mail creating processing of S401, the program for the mail creation unit 36 is started, and the address of the other party to which the mail is to be directed, the title, text, etc., are input.

Figure 11A:
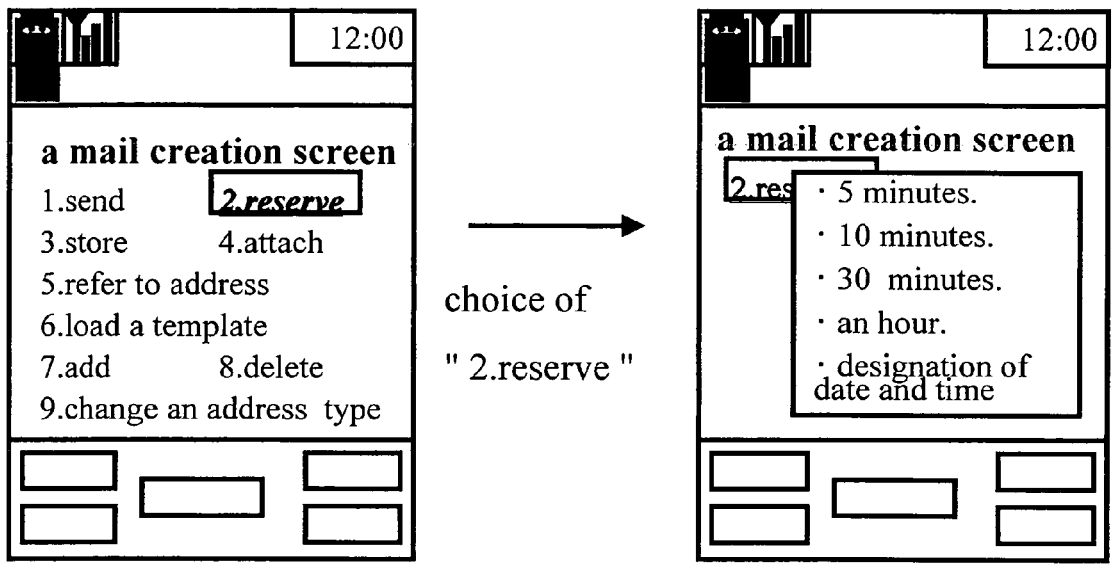
FIG. 11A is a view showing a change of a display screen of a portable telephone device according to an embodiment of the present invention when a "transmission reservation" menu key is selected.
Figure 11B:
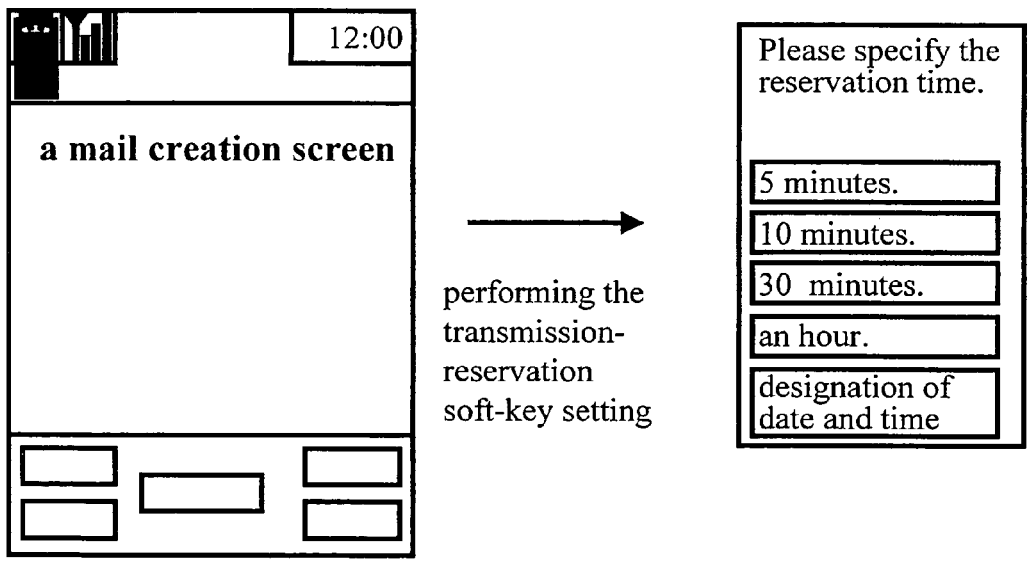
FIG. 11B is a view showing a change of the display screen of the portable telephone device when transmission-reservation soft-key setting is selected.

In step S402, the mail creation unit 36 determines whether the user sets the created mail as reserved mail by menu-key setting or transmission-reservation soft-key setting. If the created mail is set as reserved mail by the menu-key setting, the flow proceeds to step S403. If the created mail is set as reserved mail by the transmission-reservation soft-key setting, the flow proceeds to step S404. The menu-key setting and the transmission-reservation soft-key setting will now be described. As shown in FIG. 11A, a mail creation screen includes soft keys 45 to 49. The positions of the soft keys 45, 46, 47, 48, and 49 correspond to the positions of the function keys 27 and 42, the set key 28, and the function keys 43 and 44 shown in FIG. 1, respectively. For example, the set key 28 shown in FIG. 1 is operated when the soft key 47 shown in FIG. 11A is to be operated, and the function key 44 shown in FIG. 1 is operated when the soft key 49 is to be operated. The soft keys 45 to 49 are selectively operated to display an address book or to add a destination. The menu-key setting is performed by operating the soft key 45 shown in FIG. 11A, i.e., the function key 27 shown in FIG. 1. As shown in FIG. 11B, the transmission-reservation soft-key setting is performed by operating the soft key 46, i.e., the function key 42 shown in FIG. 1.

In step S403, the menu-key setting is performed, thereby displaying a menu screen including menu keys associated with mail transmission. Then, the flow proceeds to step S405.

In step S405, a "transmission reservation" menu key is selected on the menu screen, thereby displaying sub-menu keys associated with transmission-time setting. In FIG. 11A, menu keys displayed when the user performs the menu-key setting are illustrated. The sub-menu keys associated with transmission-time setting that are displayed when the "transmission reservation" menu key is selected on the menu screen are also illustrated. Then, the flow proceeds to step S406.

In step S404, the transmission-reservation soft-key setting is performed, thereby displaying sub-menu keys associated with transmission-time setting, discussed below. In FIG. 11B, the sub-menu keys associated with transmission-time setting that are displayed when the user performs the soft-key setting is illustrated. Then, the flow proceeds to step S406.

Figure 12A:
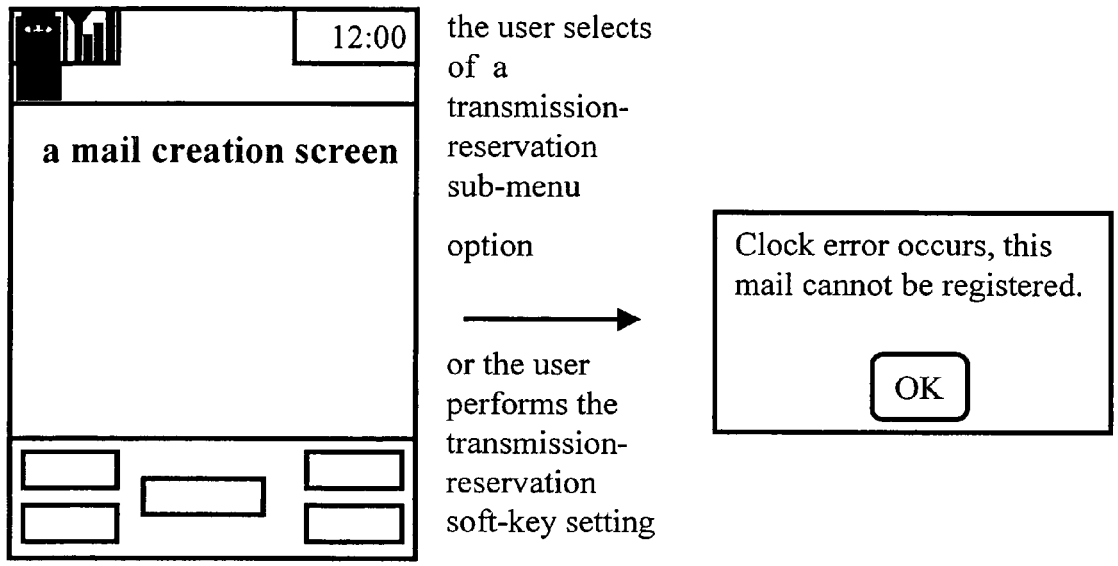
FIG. 12A is a view showing a change of a display screen of a portable telephone device according to an embodiment of the present invention, showing an error message displayed on the display screen when the internal clock of the portable telephone device has not been set.

In step S406, the mail creation unit 36 determines whether or not a real time clock (RTC) is enabled, that is, whether or not the internal clock of the portable telephone device has been set. If this determination is affirmative, i.e., if the RTC is enabled, the flow proceeds to step S407. If the determination in step S406 is negative, in step S408, the message "clock error occurs, this mail cannot be registered" is displayed, and the user is notified of an error indicating that the internal clock of the portable telephone device has not been set. In step S409, mail to be transmitted as reserved mail is registered in the unsent mailbox 6a. Then, the processing ends, and, in step S410, the user returns to a standby screen. The user sets the current time in the portable telephone device, as needed. Thereafter, the user reserves transmission of unsent mail in the unsent mailbox 6a again. FIG. 12A illustrates an error message displayed on the mail creation screen, indicating that the RTC is disabled when the user selects a transmission-reservation sub-menu option or when the user performs the transmission-reservation soft-key setting.

Figure 12B:
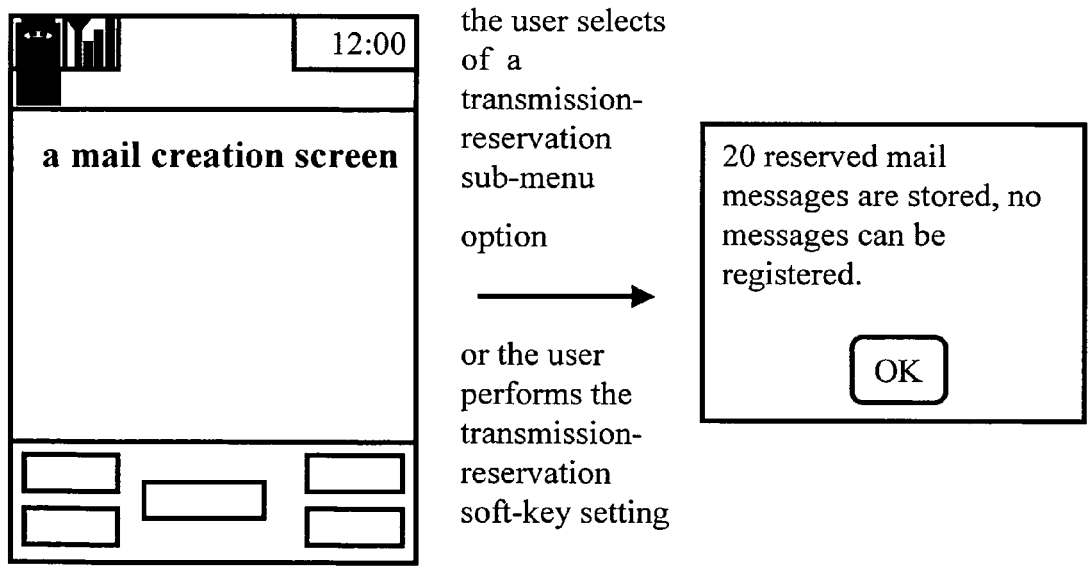
FIG. 12B is a view showing a change of the display screen of the portable telephone device, showing an error message displayed on the display screen when 20 reserved mail messages are stored.

In step S407, the mail creation unit 36 determines whether or not the number of stored reserved mail messages is the maximum value or lower. If this determination is affirmative, i.e., if the number of stored reserved mail messages is the maximum value or lower, the flow proceeds to step S411. If the determination in step S407 is negative, in step S412, the message "20 reserved mail messages are stored, no messages can be registered" is displayed, and the user is notified of the maximum number of stored reserved mail messages (in this embodiment, the maximum number is 20). In step S413, the mail is registered in the unsent mailbox 6a. Then, the processing ends, and, in step S414, the user returns to the standby screen. The user deletes reserved mail from the unsent mailbox 6a, as needed, to reduce the number of stored messages. Thereafter, the user reserves transmission of unsent mail in the unsent mailbox 6a again. FIG. 12B illustrates an error message displayed on the mail creation screen, indicating that the number of stored reserved mail messages reaches the maximum when the user selects the transmission-reservation sub-menu option or when the user performs the transmission-reservation soft-key setting.

Figure 13A:
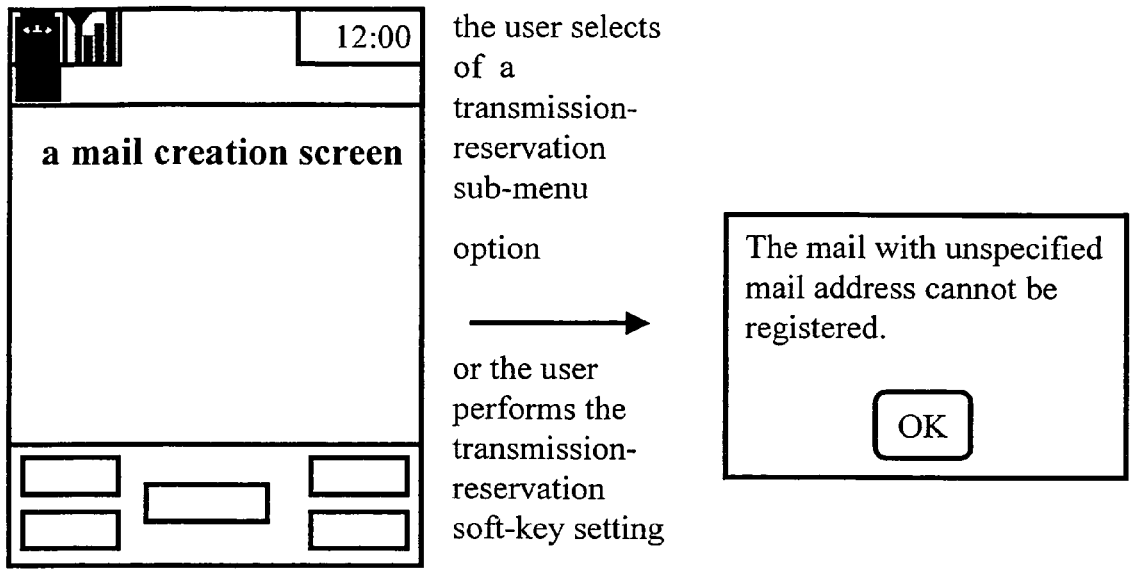
FIG. 13A is a view showing a change of a display screen of a portable telephone device according to an embodiment of the present invention, showing an error message displayed on the display screen when the mail address of the other communication party has not been specified.

In step S411, the mail creation unit 36 determines whether or not the mail address has been set. If this determination is affirmative, i.e., if the mail address has been set, the flow proceeds to step S415 shown in FIG. 5. If the determination in step S411 is negative, then, in step S416, the message "mail with unspecified mail address cannot be registered" is displayed, and the user is prompted to enter the address. In step S417, the user returns to the mail creation screen. The user enters the mail address, as needed. FIG. 13A illustrates an error message displayed on the mail creation screen, indicating that no mail address has been set when the user selects the transmission-reservation sub-menu option or when the user performs the transmission-reservation soft-key setting.

If the determinations in steps S406, S407, and S411 are negative, the transmission-reservation sub-menu option and the transmission-reservation soft-key setting may be made inactive.

Figure 5A:
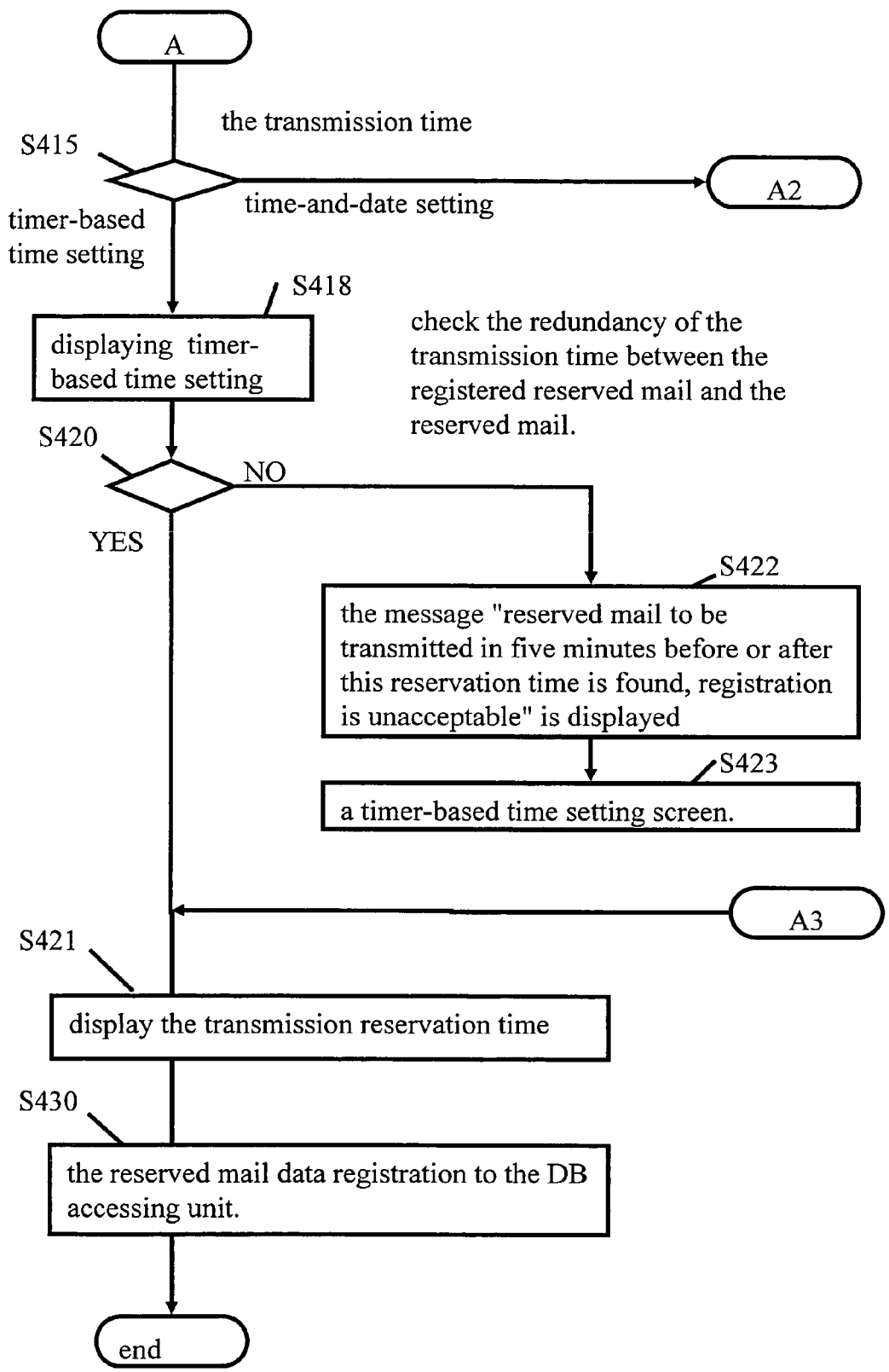
FIG. 5A is a flowchart showing the process for registering reserved mail according to the embodiment of the present invention.
Figure 5B:
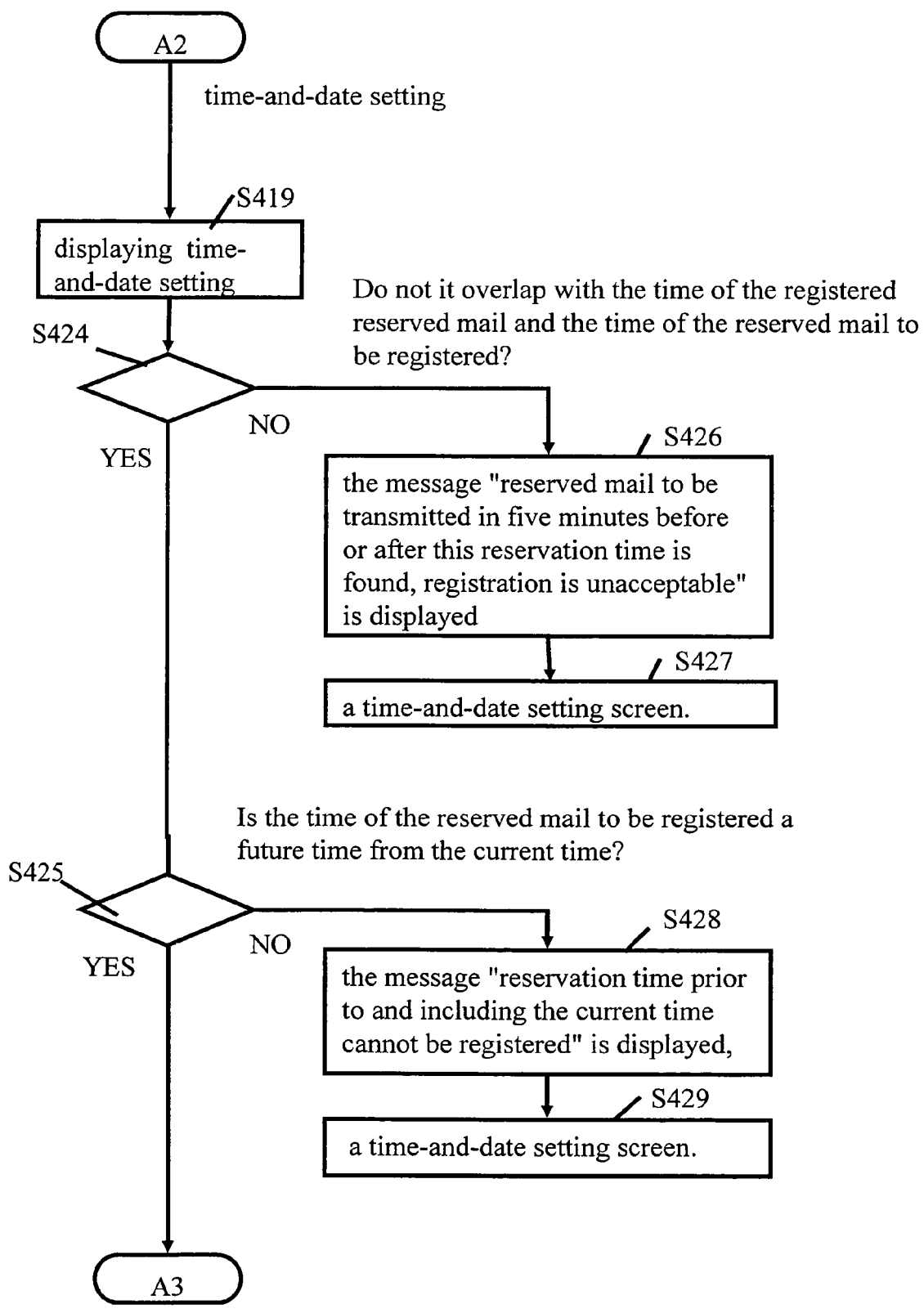
FIG. 5B is a flowchart showing the process for registering reserved mail according to the embodiment of the present invention.

The process for registering reserved mail will still be described with reference to FIG. 5A and FIG. 5B.

In step S415, the mail creation unit 36 determines whether the user specifies the transmission time by timer-based time setting or time-and-date setting. If the user selects the timer-based time setting, the flow proceeds to step S418. If the user selects the time-and-date setting to specify the minute, hour, day, month, and year at which the mail is to be transmitted, the flow proceeds to step S419. In the timer-based time setting, a desired reservation time at which the mail is to be transmitted after the current time of the terminal device is specified. In this embodiment, as shown in FIGS. 11A and 11B, mail transmission at five minutes later, ten minutes later, half an hour later, or an hour later from the current time of the terminal device may be selected. In the time-and-date setting, the minute, hour, day, month, and year at which the mail is to be transmitted are specified. If the user selects the timer-based time setting, the flow proceeds to step S418.

In step S418, the user selects a reservation time at which the mail is to be transmitted after the current time. The selected reservation time is converted into actual clock time to help check the redundancy of the transmission time between the registered reserved mail and the reserved mail to be registered in step S420, discussed below. Then, the flow proceeds to step S420.

Figure 13B:
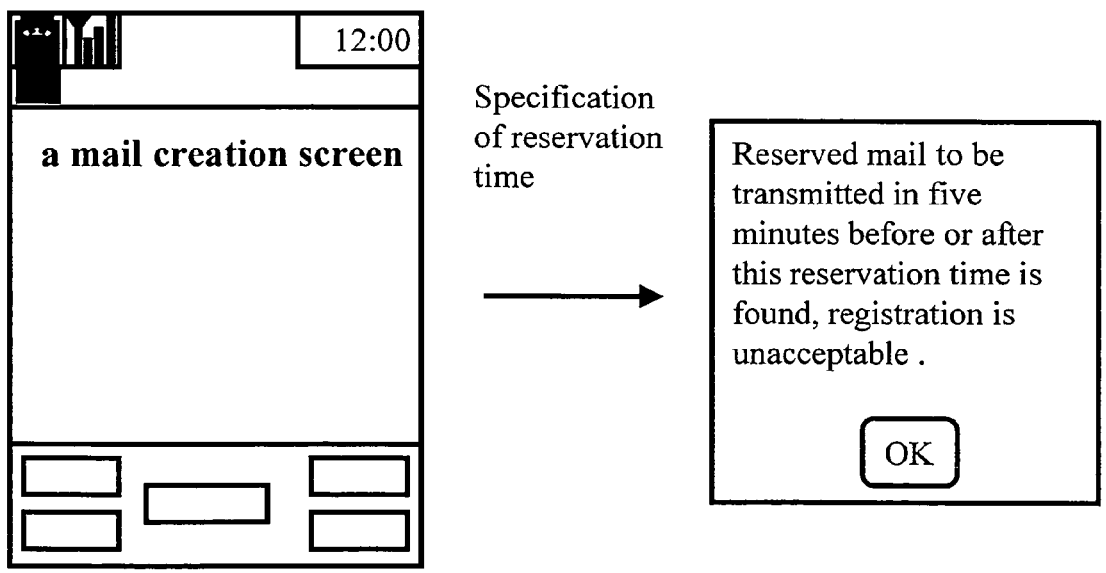
FIG. 13B is a view showing a change of the display screen of the portable telephone device, showing an error message displayed on the display screen when reserved mail to be transmitted in five minutes before or after a specified reservation time is found.

In step S420, the mail creation unit 36 determines whether or not the time of the registered reserved mail and the time of the reserved mail to be registered overlap each other. If this determination is affirmative, i.e., if the time of the registered reserved mail and the time of the mail to be registered do not overlap each other, the flow proceeds to step S421. If the determination in step S420 is negative, in step S422, the message "reserved mail to be transmitted in five minutes before or after this reservation time is found, registration is unacceptable" is displayed, and the user is prompted to change the reservation time. In step S423, the user returns to a timer-based time setting screen. FIG. 13B illustrates an error message displayed on the mail creation screen, indicating that reserved mail to be transmitted in five minutes before or after the reservation time specified by the user after selecting the transmission-reservation sub-menu option or performing the transmission-reservation soft-key setting is found. The user is prompted to change the reservation time because the data traffic on the network increases if reserved messages are sequentially mailed in five minutes, resulting in a heavy load on the network. The user sets another reservation time by the timer-based time setting, as needed.

Figure 14A:
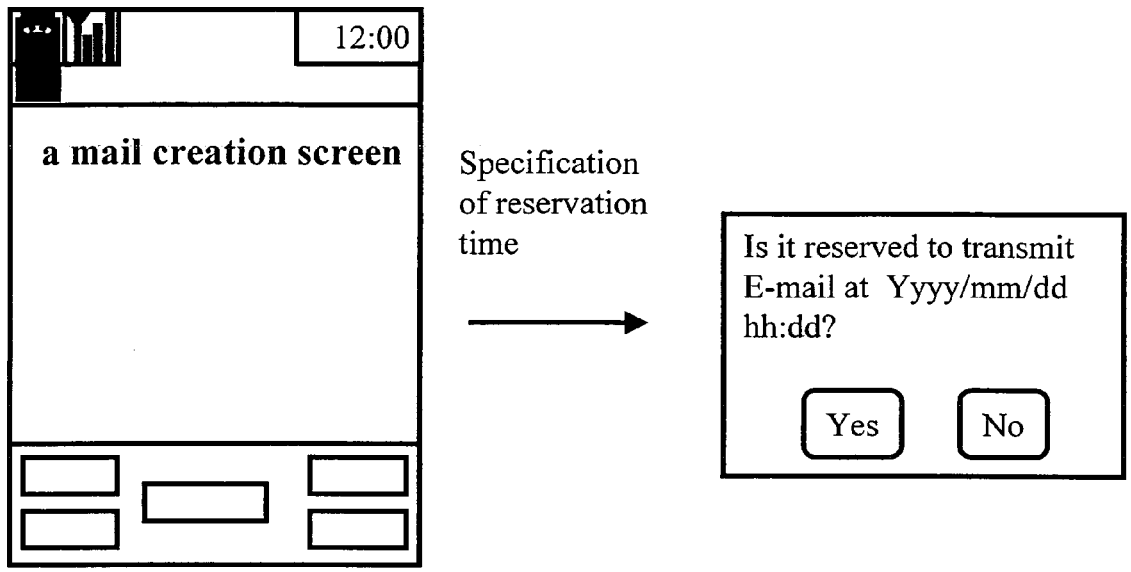
FIG. 14A is a view showing a change of a display screen of a portable telephone device according to an embodiment of the present invention, showing a message displayed on the display screen in a case of notifying the user of a reservation time.
Figure 14B:
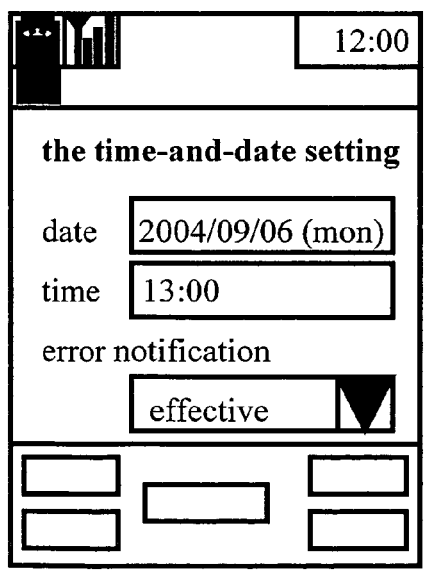
FIG. 14B is a view showing a change of the display screen of the portable telephone device, showing a message displayed on the display screen when a transmission time and date is specified.

In step S419, the user sets the reservation time at which the mail is to be transmitted by specifying the minutes, hour, day, month, and year. FIG. 14B illustrates a screen that is displayed when the user selects the time-and-date setting after selecting the transmission-reservation sub-menu option or performing the transmission-reservation soft-key setting. The user sets a desired time and date at which the mail is to be transmitted. Then, the flow proceeds to step S424.

Figure 15A:
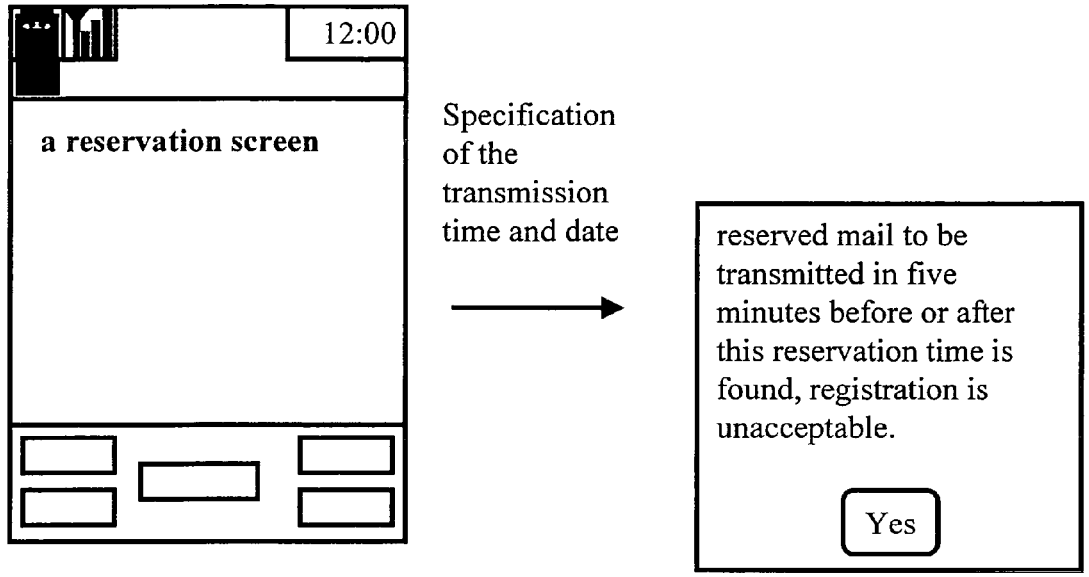
FIG. 15A is a view showing a change of a display screen of a portable telephone device according to an embodiment of the present invention, showing an error message displayed on the display screen when reserved mail to be transmitted in five minutes before or after a specified transmission time and date is found.

In step S424, the mail creation unit 36 determines whether or not the time of the registered reserved mail and the time of the reserved mail to be registered overlap each other. If this determination is affirmative, i.e., if the time of the registered reserved mail and the time of the reserved mail to be registered do not overlap each other, the flow proceeds to step S425. If the determination in step S424 is negative, in step S426, the message "reserved mail to be transmitted in five minutes before or after this reservation time is found, registration is unacceptable" is displayed, and the user is prompted to change the reservation time. In step S427, the user returns to a time-and-date setting screen. FIG. 15A illustrates an error message displayed on the mail creation screen, indicating that reserved mail to be transmitted in five minutes before or after the transmission time and date specified by the user after selecting the time-and-date setting is found. The user is prompted to change the reservation time because the data traffic on the network increases if reserved messages are sequentially mailed in five minutes, resulting in a rapidly heavy load on the network. The user sets another transmission time and date, as needed.

Figure 15B:
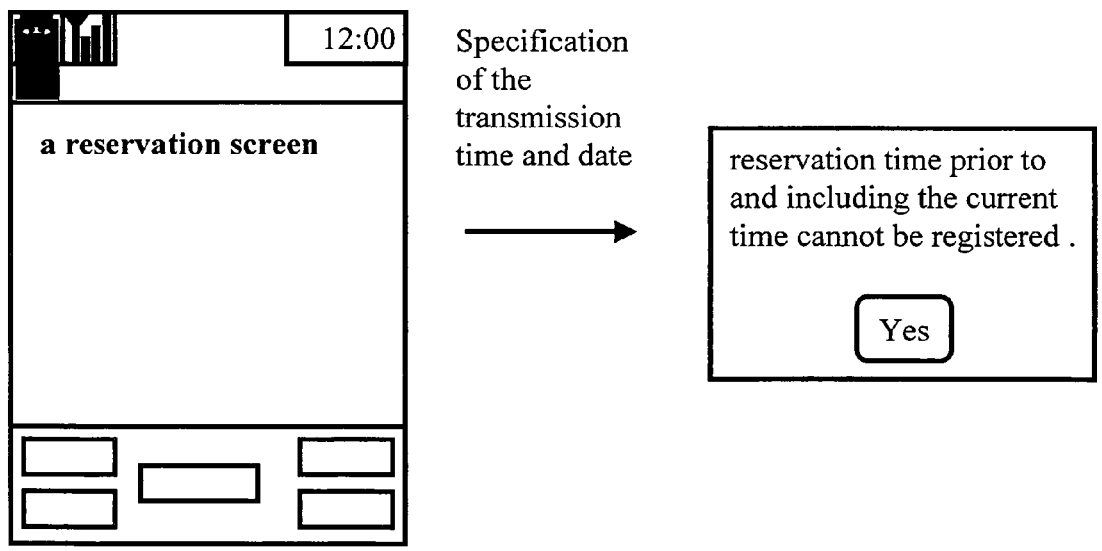
FIG. 15B is a view showing a change of the display screen of the portable telephone device according to an embodiment of the present invention, showing a message displayed on the display screen when a specified transmission time and date is the current time or a past time from the current time.

In step S425, the mail creation unit 36 determines whether or not the time of the reserved mail to be registered is a future time from the current time. If this determination is affirmative, i.e., if the time of the reserved mail is not the current time or a past time from the current time, the flow proceeds to step S421. If the determination in step S425 is negative, in step S428, the message "reservation time prior to and including the current time cannot be registered" is displayed, and the user is prompted to change the reservation time. In step S429, the user returns to a time-and-date setting screen. FIG. 15B illustrates an error message displayed on the mail creation screen, indicating that the transmission time and date specified after selecting the time-and-date setting is the current time or a past time from the current time. The user sets another transmission time and date, as needed.

Figure 16:
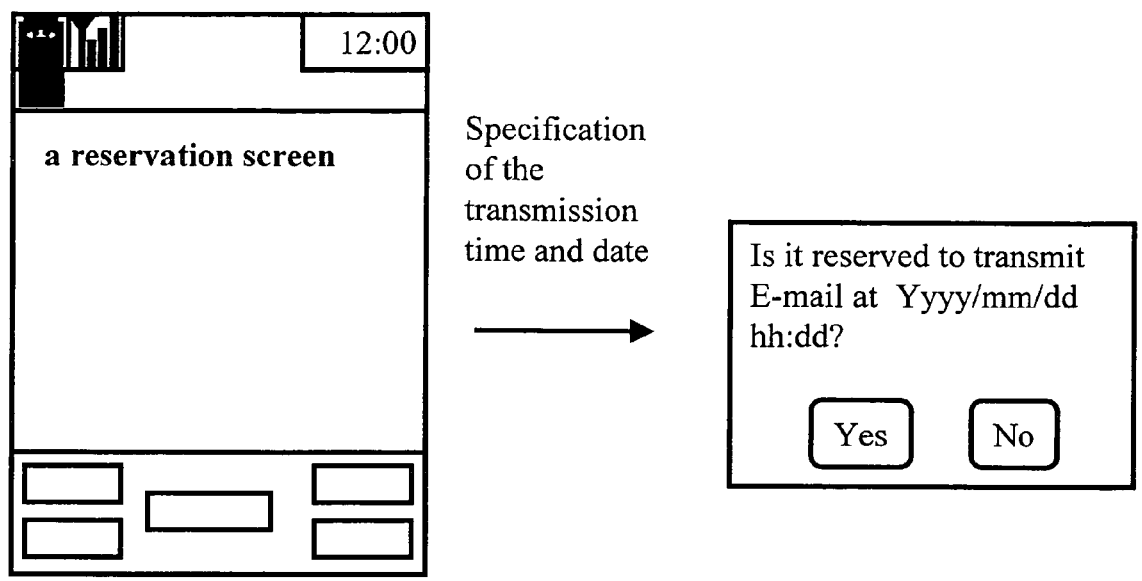
FIG. 16 is a view showing a change of a display screen of a portable telephone device according to an embodiment of the present invention, showing a message displayed on the display screen in a case of specifying a transmission time and date and notifying the user of a reservation time.

In step S421, a registration notification screen is displayed, and the user is notified of the transmission reservation time. FIG. 14A illustrates a registration notification screen displayed when the timer-based time setting is selected, and FIG. 16 illustrates a registration notification screen displayed when the time-and-date setting is selected. The user confirms that the transmission reservation time is correct, and "OK" is clicked. Then, the flow proceeds to step S430.

In step S430, the mail creation unit 36 registers data including the reservation time and an identifier of reserved mail in the DB accessing unit 39. Then, the flow ends.

Figure 6:
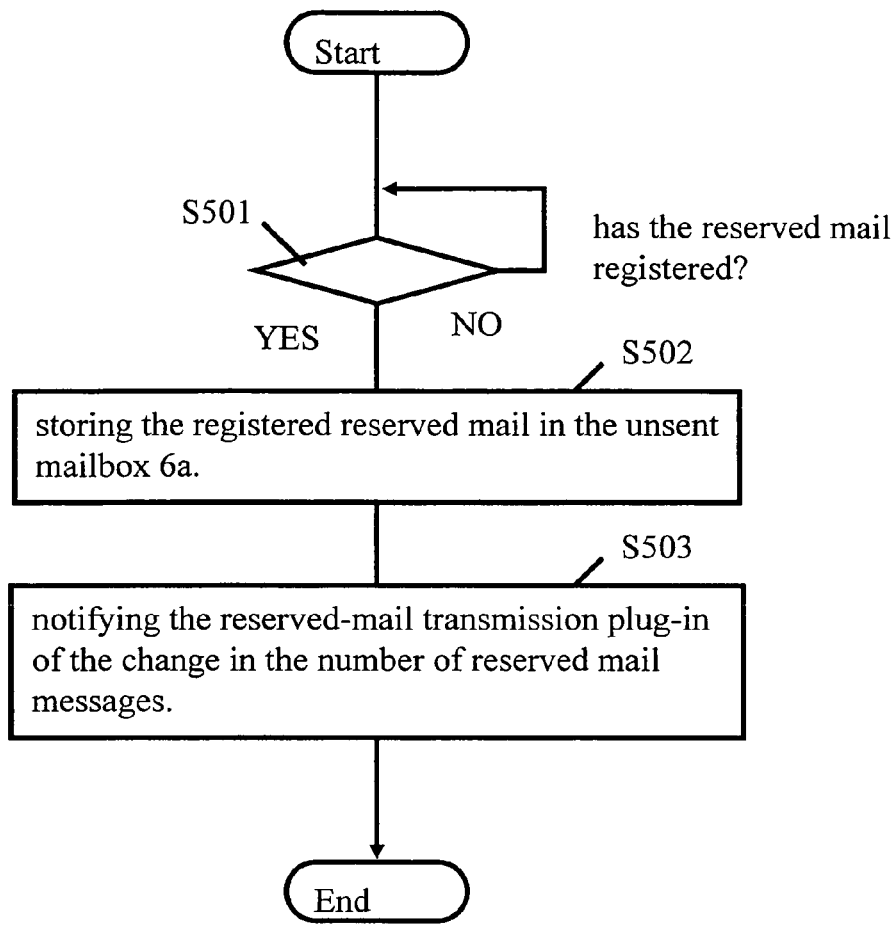
FIG. 6 is a flowchart showing an operation of a DB accessing unit 39 according to an embodiment of the present invention.

An operation of the DB accessing unit 39 will now be described with reference to FIG. 6.

In step S501, the DB accessing unit 39 determines whether or not the mail creation unit 36 has registered reserved mail. If this determination is affirmative, the flow proceeds to step S502. If this determination is negative, the flow returns to step S501.

In step S502, the DB accessing unit 39 stores the registered reserved mail in the unsent mailbox 6a. Then, the flow proceeds to step S503.

In step S503, the DB accessing unit 39 notifies the reserved-mail transmission plug-in 31 of the change in the number of reserved mail messages stored in the unsent mailbox 6a. Then, the flow ends.

Figure 7:
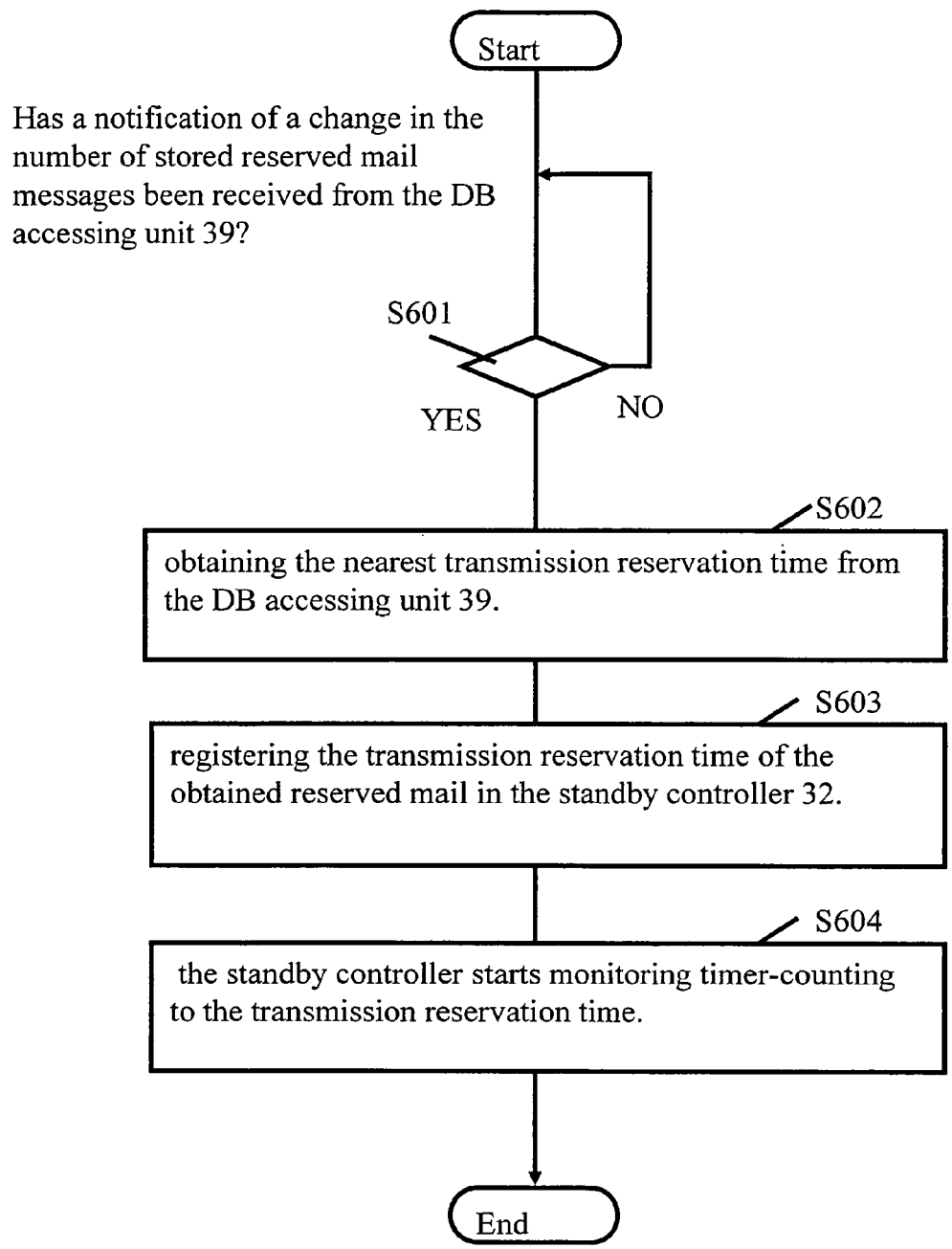
FIG. 7 is a flowchart showing an operation of a reserved-mail transmission plug-in 31 according to an embodiment of the present invention.

An operation of the reserved-mail transmission plug-in 31 to register a transmission reservation time will now be described with reference to FIG. 7.

In step S601, the reserved-mail transmission plug-in 31 determines whether or not a notification of a change in the number of stored reserved mail messages has been received from the DB accessing unit 39. If this determination is affirmative, the flow proceeds to step S602. If this determination is negative, the flow returns to step S601.

In step S602, in response to the notification of the change in the number of stored reserved mail messages from the DB accessing unit 39, the reserved-mail transmission plug-in 31 obtains the reserved mail having the nearest transmission reservation time from the DB accessing unit 39. Then, the flow proceeds to step S603.

In step S603, the reserved-mail transmission plug-in 31 registers the transmission reservation time of the obtained reserved mail in the standby controller 32. Then, the flow proceeds to step S604.

In step S604, the standby controller 32 stores the transmission reservation time of the reserved mail, and uses the timer 34, which is a function of the OS, to start monitoring timer-counting to the transmission reservation time based on the transmission reservation time and the current time. Then, the flow ends.

Figure 8:
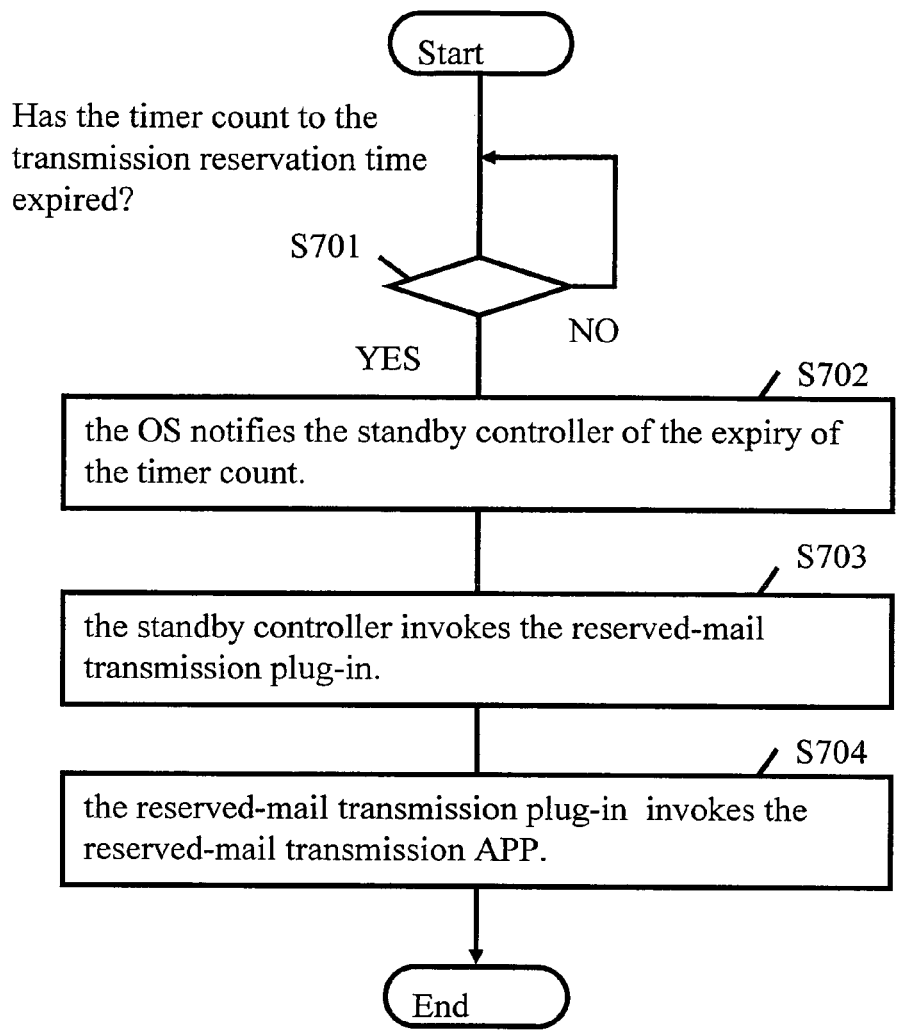
FIG. 8 is a flowchart showing an operation of the reserved-mail transmission plug-in 31 according to an embodiment of the present invention.

An operation of the reserved-mail transmission plug-in 31 to invoke the reserved-mail transmission APP 35 will now be described with reference to FIG. 8.

In step S701, the standby controller 32 determines whether or not the timer count to the transmission reservation time has expired. If this determination is affirmative, the flow proceeds to step S702. If this determination is negative, the flow returns to step S701.

In step S702, the OS notifies the standby controller 32 of the expiry of the timer count to the transmission reservation time. Then, the flow proceeds to step S703.

In step S703, the standby controller 32 notifies the reserved-mail transmission plug-in 31 of the expiry of the timer count. Then, the flow proceeds to step S704.

In response to the notification of the expiry of the timer count, in step S704, the reserved-mail transmission plug-in 31 invokes the reserved-mail transmission APP 35. Then, the flow ends.

Figure 9A:
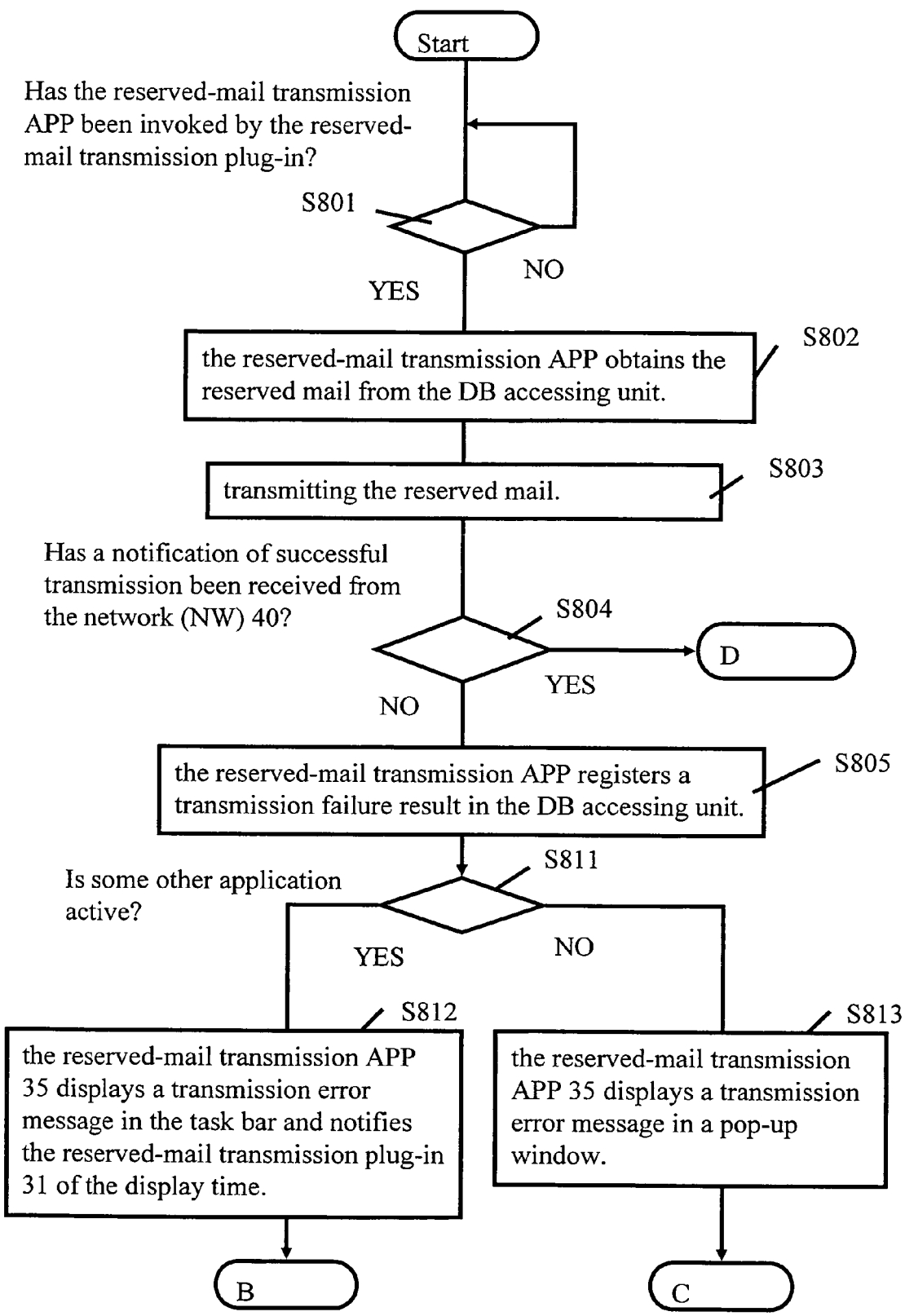
FIG. 9A is a flowchart showing an operation of a reserved-mail transmission APP 35 according to an embodiment of the present invention.
Figure 9B:
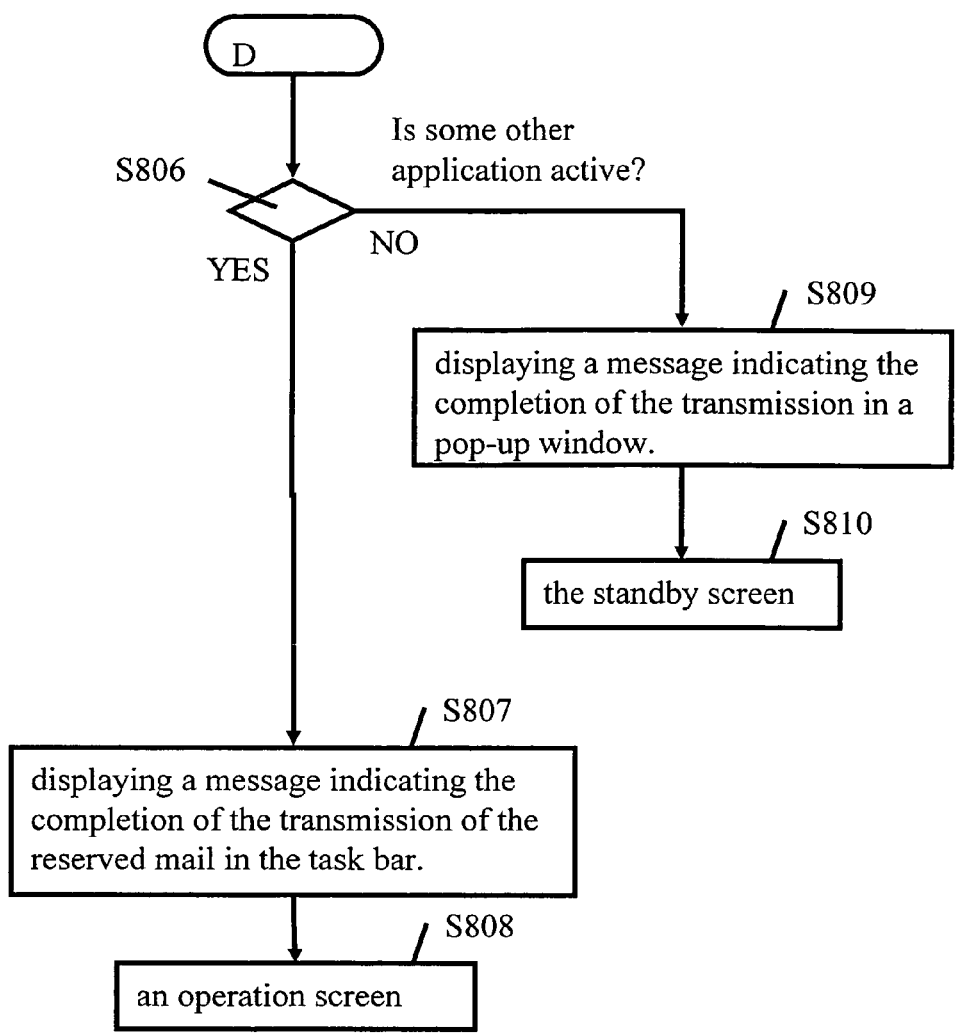
FIG. 9B is a flowchart showing an operation of a reserved-mail transmission APP 35 according to an embodiment of the present invention.

An operation of the reserved-mail transmission APP 35 to transmit reserved mail and an operation in a case where the reserved mail fails to be transmitted will now be described with reference FIG. 9A and FIG. 9B.

In step S801, the reserved-mail transmission APP 35 determines whether or not the reserved-mail transmission APP 35 has been invoked by the reserved-mail transmission plug-in 31. If this determination is affirmative, the flow proceeds to step S802. If this determination is negative, the flow returns to step S801.

In step S802, the reserved-mail transmission APP 35 obtains reserved mail associated with the transmission reservation time and the identifier from the DB accessing unit 39. Then, the flow proceeds to step S803.

In step S803, the reserved-mail transmission APP 35 transmits the reserved mail. Then, the flow proceeds to step S804.

In step S804, the reserved-mail transmission APP 35 determines whether or not a notification of successful transmission has been received from the network (NW) 40. If this determination is affirmative, the flow proceeds to step S806. If the determination in step S804 is negative, the flow proceeds to step S805. The determination as to whether or not the transmission is successful may be done within the device itself and otherwise. For example, when the time of the reserved mail has passed when the terminal device is turned on or when the terminal device in an out-of-service range fails to access a public switched telephone network (PSTN), the determination as to whether or not the transmission is successful is done within the device itself. For example, when the address of the other communication party does not exist, the determination as to whether or not the transmission is successful is not done within the device itself. In order to detect non-existence of the address of the other communication party, it is necessary to find the mail message associated therewith from addresses-unknown error messages. This operation may be performed by using, for example, a technique disclosed in Japanese Unexamined Patent Application Publication No. 5-316144. That is, the following arrangement may be used. When mail created by a user is converted into transmission mail, a mail ID unique to the transmission mail is set. A copy of the transmission mail including the unique mail ID is stored in a transmission-mail storage unit. Then, the mail is transmitted. If the mail fails to be delivered due to unknown address, mail having the same mail ID as the mail ID of the failed mail is selected from the transmission-mail storage unit. An error message including the content of the selected mail is therefore presented to the user.

Figure 17:
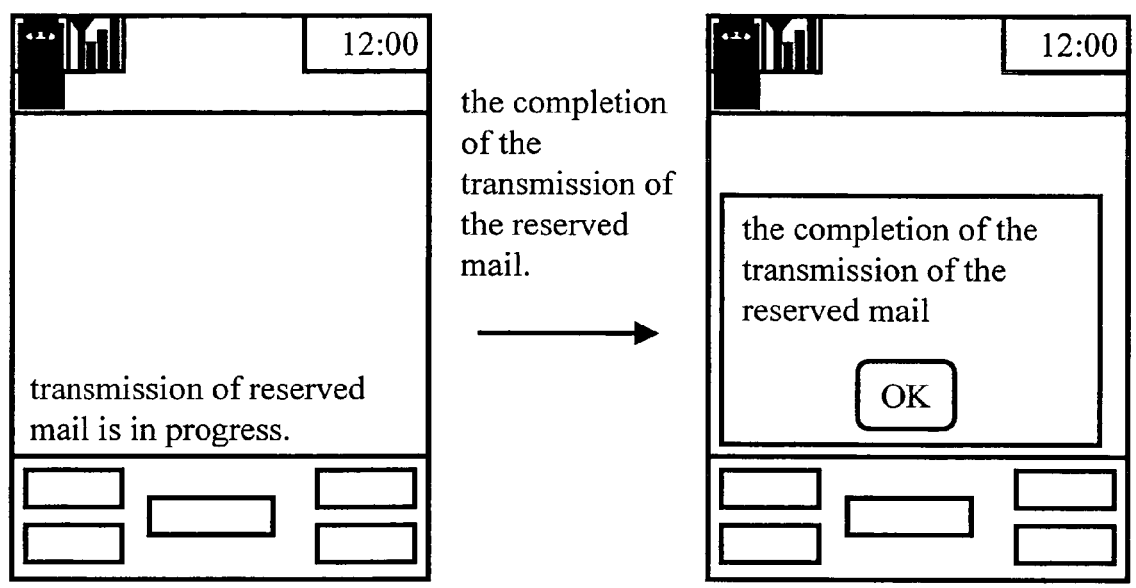
FIG. 17 is a view showing a change of a display screen of a portable telephone device according to an embodiment of the present invention when a message indicating completion of transmission is displayed in a pop-up window while no other application is active.
Figure 19:
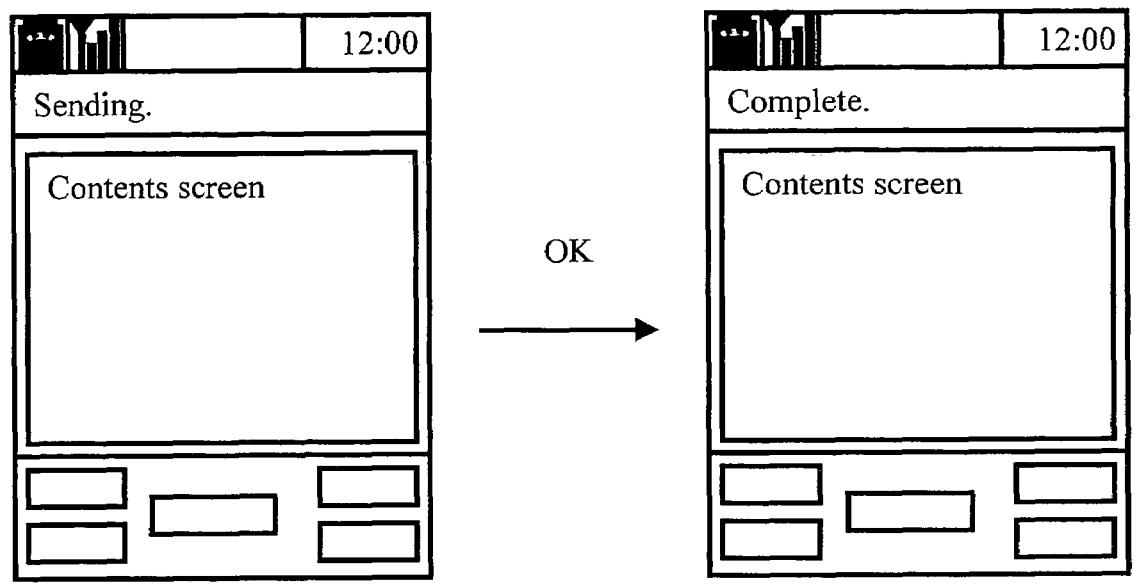
FIG. 19 is a view showing a change of a display screen of a portable telephone device according to an embodiment of the present invention, in which a message indicating completion of transmission is displayed in the task bar while some other application is active.

In step S806, the reserved-mail transmission APP 35 determines whether or not some other application is active. If this determination is affirmative, in step S807, the reserved-mail transmission APP 35 displays a message indicating the completion of the transmission of the reserved mail in the task bar. When the message displayed in the task bar is turned off after a certain period of time, then, in step S808, the user returns to an operation screen for a task being performed. FIG. 19 illustrates, while some other application is active, a view indicating that transmission of reserved mail is in progress and a view in which a message indicating the completion of the transmission of the reserved mail is displayed in the task bar. If the determination in step S806 is negative, in step S809, the reserved-mail transmission APP 35 displays a message indicating the completion of the transmission of the reserved mail in a pop-up window. When the user operates the set key and the pop-up window is closed, then, in step S810, the user returns to the standby screen. FIG. 17 illustrates, while no other application is active, a view indicating that transmission of reserved mail is in progress and a view in which a message indicating the completion of the transmission of the reserved mail is displayed in a pop-up window.

In step S805, the reserved-mail transmission APP 35 registers a transmission failure result in the DB accessing unit 39. Then, the flow proceeds to step S811.

In step S811, the reserved-mail transmission APP 35 determines whether or not some other application is active. If this determination is affirmative, in step S812, the reserved-mail transmission APP 35 displays a transmission error message in the task bar. Then, the flow proceeds to step S814 shown in FIG. 10. If the determination in step S811 is negative, then, in step S813, the reserved-mail transmission APP 35 displays a transmission error message in a pop-up window. Then, the flow proceeds to step S821 shown in FIG. 21.

Figure 10:
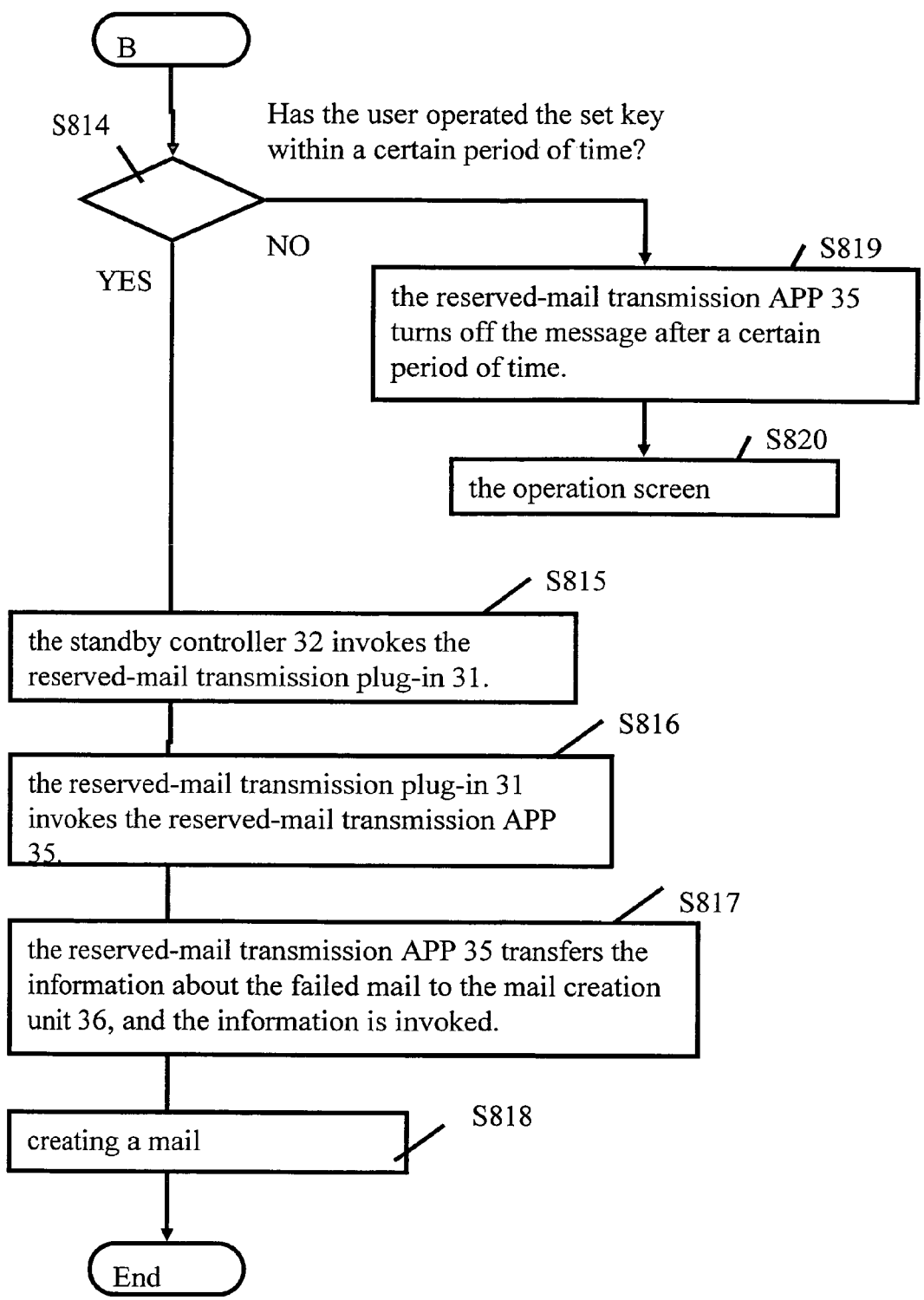
FIG. 10 is a flowchart showing the operation of the reserved-mail transmission APP 35 according to the embodiment of the present invention.

The operation of the reserved-mail transmission APP 35 to transmit reserved mail and an operation in a case where the reserved mail fails to be transmitted will still be described with reference to FIG. 10.

In step S814, the standby controller 32 determines whether or not the user has operated the set key within a certain period of time during which the transmission error message is displayed. If this determination is affirmative, the flow proceeds to S815. If this determination is negative, then, in step S819, the reserved-mail transmission APP 35 turns off the message displayed in the task bar after a certain period of time. Then, in step S820, the user returns to the operation screen for the task being performed.

In step S815, in response to the operation of the set key by the user, the standby controller 32 invokes the reserved-mail transmission plug-in 31. Then, the flow proceeds to step S816.

In step S816, the reserved-mail transmission plug-in 31 invokes the reserved-mail transmission APP 35.

Figure 20:
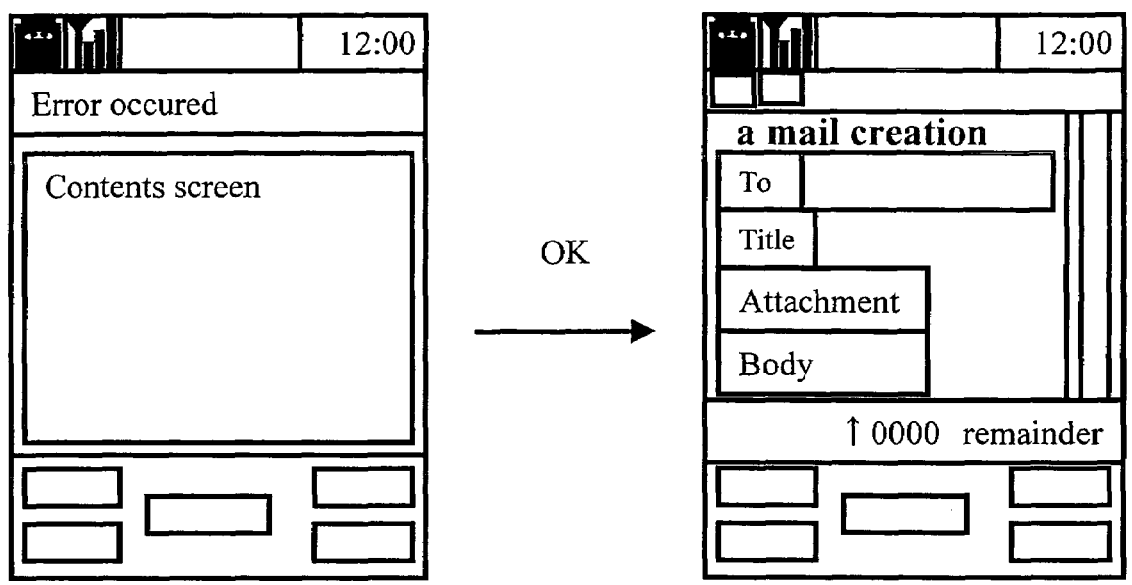
FIG. 20 is a view showing a change of a display screen of a portable telephone device according to an embodiment of the present invention, in which a message indicating that reserved mail fails to be transmitted is displayed in the task bar while some other application is active and the user operates the set key within a certain period of time to change the display screen to the screen for editing the failed reserved mail.

In step S817, the reserved-mail transmission APP 35 transfers the information about the failed mail to the mail creation unit 36, and the information is invoked. Then, the flow proceeds to step S818 (corresponding to step S401 shown in FIG. 4). FIG. 20 illustrates that an error message is displayed in the task bar while some other application is active and that the user operates the set key within a certain period of time to thereby allow the user to return to the mail-editing screen.

In step S818, the user takes an appropriate action on the failed reserved mail. The action is to edit the mail, to re-transmit the failed mail, to change the transmission reservation time, or the like. The mail may be edited by modifying the mail text, re-entering an address, or the like.

Figure 21:
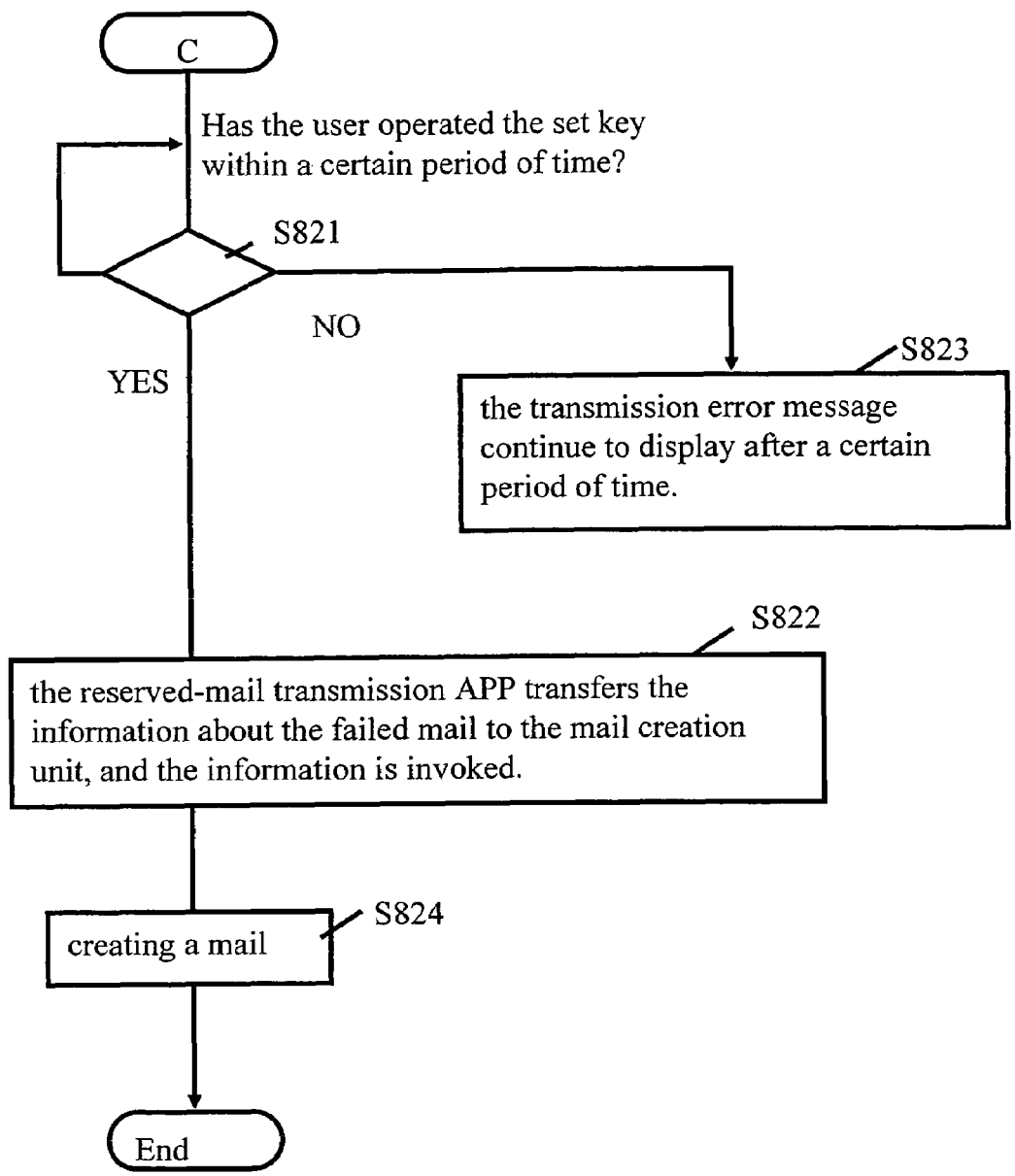
FIG. 21 is a flowchart showing an operation of the reserved-mail transmission APP 35 according to an embodiment of the present invention.

The operation of the reserved-mail transmission APP 35 to transmit reserved mail and an operation in a case where the reserved mail fails to be delivered will still be described with reference to FIG. 21.

In step S821, the reserved-mail transmission APP 35 determines whether or not the user has operated the set key within a certain period of time after the transmission error message is displayed. If this determination is affirmative, the flow proceeds to step S822. If this determination is negative, then, in step S823, the transmission error message is continuously displayed until the user performs an operation.

Figure 18:
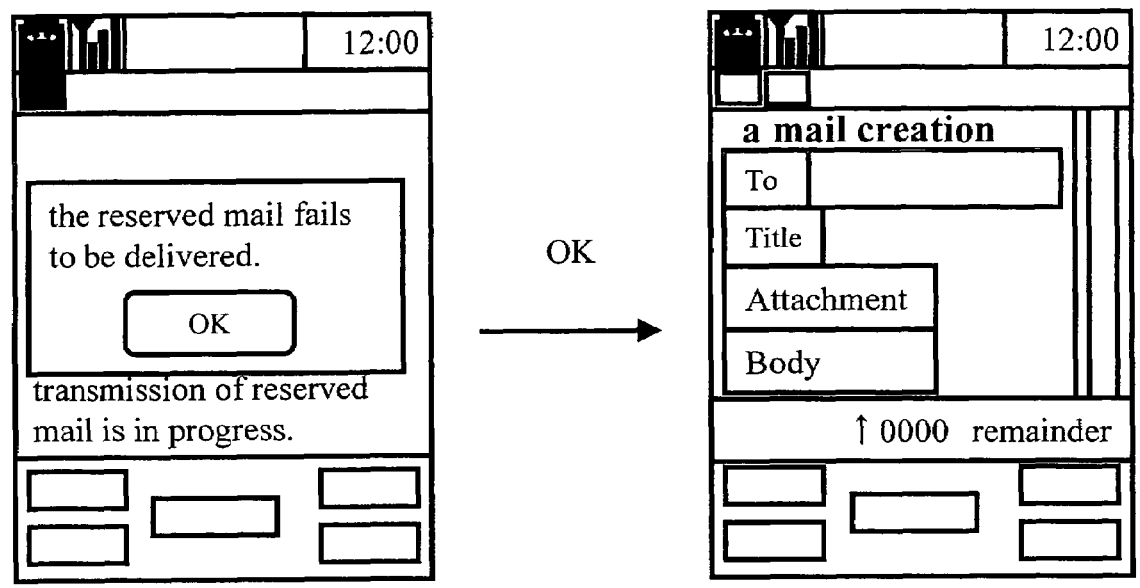
FIG. 18 is a view showing a change of a display screen of a portable telephone device according to an embodiment of the present invention, in which a message indicating that reserved mail fails to be transmitted is displayed in a pop-up window while some other application is active and the user operates a set key within a certain period of time to change the display screen to a screen for editing the failed reserved mail.

In response to the operation of the set key by the user, in step S822, the reserved-mail transmission APP 35 transfers the information about the failed mail to the mail creation unit 36, and the information is invoked. Then, the flow proceeds to step S824 (corresponding to step S401 shown in FIG. 4). FIG. 18 illustrates that an error message is displayed in a pop-up window while no other application is active and that the user operates the set key within a certain period of time to thereby allow the user to return to the mail-editing screen.

Figure 22:
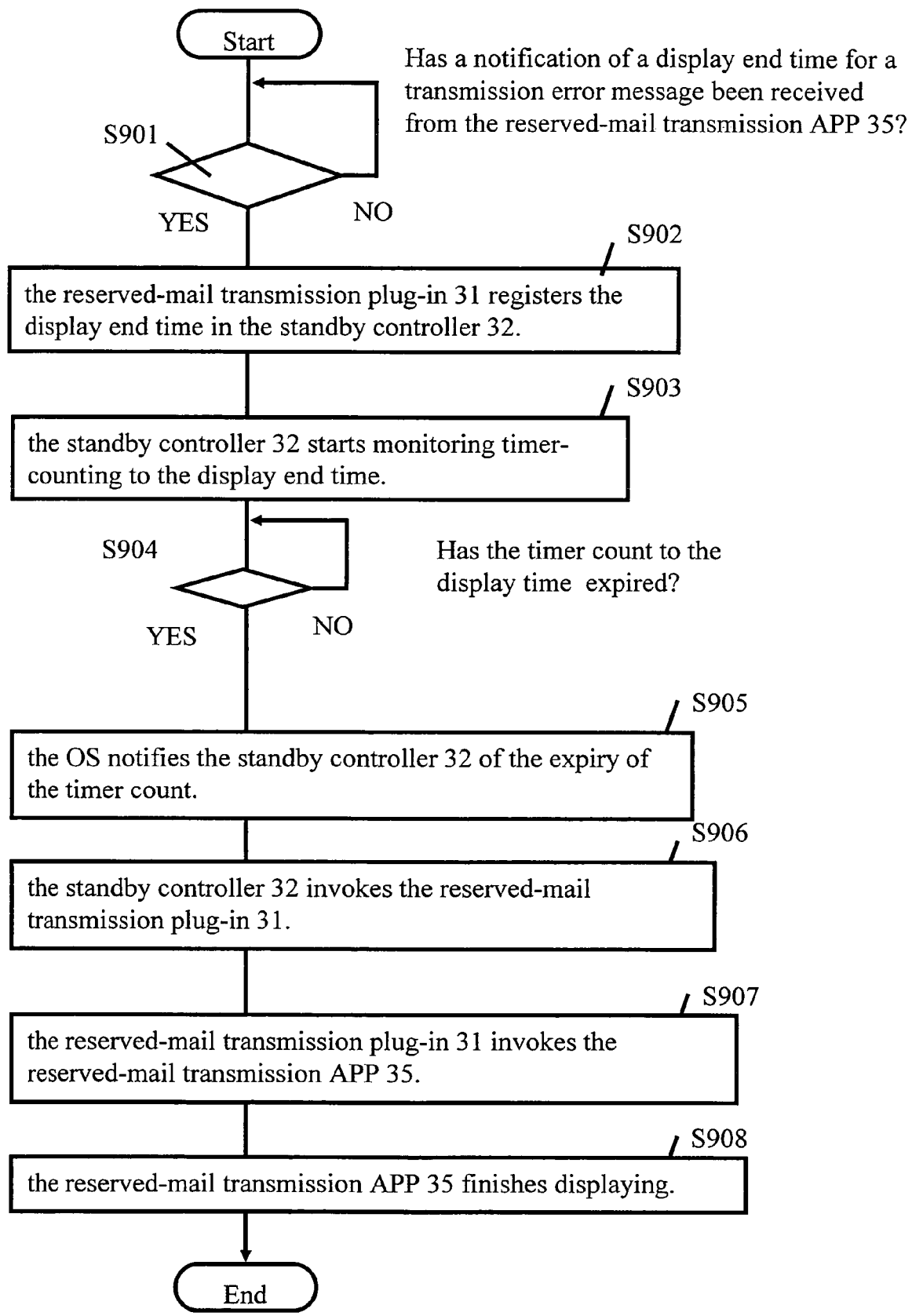
FIG. 22 is a flowchart showing a process for displaying a transmission error message in the task bar for a certain period of time according to an embodiment of the present invention.

An operation of the reserved-mail transmission APP 35 to display an error message in the task bar for a certain period of time will now be described with reference to FIG. 22.

In step S901, the reserved-mail transmission plug-in 31 determines whether or not a notification of a display end time for a transmission error message has been received from the reserved-mail transmission APP 35. If this determination is affirmative, the flow proceeds to step S902. If this determination is negative, the flow returns to step S901.

In step S902, the reserved-mail transmission plug-in 31 registers the display end time in the standby controller 32. Then, the flow proceeds to step S903.

In step S903, the standby controller 32 stores the display end time, and uses the timer 34, which is a function of the OS, to start monitoring timer-counting to the display end time based on the display end time and the current time. Then, the flow proceeds to step S904.

In step S904, the standby controller 32 determines whether or not the timer count to the display time has expired. If this determination is affirmative, the flow proceeds to step S905. If this determination is negative, the flow returns to step S904.

In step S905, the OS notifies the standby controller 32 of the expiry of the timer count to the display time. Then, the flow proceeds to step S906.

In step S906, the standby controller 32 notifies the reserved-mail transmission plug-in 31 of the expiry of the timer count. Then, the flow proceeds to step S907.

In response to the notification of the expiry of the timer count, in step S907, the reserved-mail transmission plug-in 31 invokes the reserved-mail transmission APP 35. Then, the flow proceeds to step S908.

In step S908, when invoked by the reserved-mail transmission plug-in 31, the reserved-mail transmission APP 35 finishes displaying the transmission error message.

As discussed above, according to the present embodiment, when reserved mail fails to be delivered, a transmission error message is displayed in a partial field of the display unit for a certain period of time. It is determined whether or not a specific key is operated during this period of time. If this determination is affirmative, the user returns to a screen for editing the failed reserved mail. According to the embodiment, therefore, the user can easily take an appropriate action on the failed reserved mail without performing any time-consuming operation. Moreover, keys other than the operated specific key are available for a task being performed in the foreground, and the ongoing task in the foreground is not interrupted.

What is claimed is:

1. An information terminal device having a function for reserving mail, the information terminal device comprising:
    an operation unit for operating the information terminal device;
    a communication unit for transmitting a reserving mail to a network and for receiving a returned reserving mail from the network;
    a display having a first partial field for displaying a transmission error message and a second partial field for displaying an image corresponding to an activated application program; and
    a controller
        detecting the returned reserving mail from the network and if an application program is active, preventing the transmission error message from overlaying the displayed image corresponding to the activated application program in the second partial field by displaying the transmission error message in the first partial field upon detecting the returned reserving mail,
        displaying an editing screen for editing the returned reserving mail when the operation unit is operated while the transmission error message is displayed in the first partial field,
        if the operation unit is not operated within a certain period of time during which the transmission error is displayed in the first partial field, turning off the displaying of the transmission error message in the first partial field, and
    in an application program is not active upon detecting the returned reserving mail, continuously displaying the transmission error message until the operation unit is operated.

2. The information terminal device according to claim 1, wherein the controller allows the transmission error message to be displayed in the first partial field.

3. The information terminal device according to claim 1, wherein the controller allows the transmission error message to be displayed in the first partial field, and a side of the first partial field is adjacent to a side of the second partial field showing a view for an ongoing task.

4. The information terminal device according to claim 1, wherein the controller allows the transmission error message to be displayed in the first partial field, and a bottom side of the first partial field is adjacent to a top side of the second partial field showing a view for an ongoing task.

5. The information terminal device according to claim 1, wherein the controller allows a non-delivery message, error details, or a combination of the non-delivery message and the error details to be displayed in the first partial field.

6. The information terminal device according to claim 1, wherein when the returned reserving mail is re-transmitted, the controller allows a message indicating re-transmission of the returned reserving mail to be displayed in the first partial field, a bottom side of the first partial field being adjacent to a top side of the second partial field showing a view for an ongoing task.

7. The information terminal device according to claim 1, wherein the operation unit includes a set key, and the specific key is the set key.

8. The information terminal device according to claim 1, wherein the specific key is irrelevant to an ongoing task.

9. The information terminal device according to claim 1, wherein the controller allows normal transmission or reserved transmission to be selected after displaying the editing screen for editing the returned reserving mail.

10. A portable telephone device having a function for reserving mail, the portable telephone device comprising:
    an operation unit for operating the portable telephone device;
    a communication unit for transmitting a reserving mail to a network and for receiving a returned reserving mail from the network;
    a display having a first partial field for displaying a transmission error message and a second partial field for displaying an image corresponding to an activated application program; and
    a controller
        detecting the returned reserving from the network and if an application program is active, preventing the transmission error message from overlaying the displayed image corresponding to the activated application program in the second partial field by displaying the transmission error message in the first partial field upon detecting the returned reserving mail,
        displaying an editing screen for editing the returned reserving mail when the operation unit is operated while the transmission error message is displayed in the first partial field,
        if the operation unit is not operated within a certain period of time during which the transmission error is displayed in the first partial field, turning off the displaying of the transmission error message in the first partial field, and
    if an application program is not active upon detecting the returned reserving mail, continuously displaying the transmission error message until the operation unit is operated.

11. A method for editing a reserving mail in an information terminal device, the information terminal device including an operation unit and a display having a first partial field and a second partial for displaying an image corresponding to an activated application program, the method comprising:
    transmitting a reserving mail to a network;
    receiving a returned reserving mail from the network;
    detecting the returned reserving mail from the network;
    if an application program is active, preventing a transmission error message from overlaying the displayed image corresponding to the activated application program in the second partial field by displaying the transmission error message in the first partial field upon detecting the returned reserving mail; and
    displaying an editing screen for editing the returned reserving mail when the operation unit is operated while the transmission error message is displayed in the first partial field,
    if the operation unit is not operated within a certain period of time during which the transmission error is displayed in the first partial field, turning off the displaying of the transmission error message in the first partial field, and
    if an application program is not active upon detecting the returned reserving mail, continuously displaying the transmission error message until the operation unit is operated.

12. The method according to claim 11, wherein a side of the first partial field is adjacent to a side of the second partial field.

13. The method according to claim 11, wherein a bottom side of the first partial field is adjacent to a top side of the second partial field.

14. The method according to claim 11, wherein the transmission error message includes a non-delivery message, error details, or a combination of the non-delivery message and the error details.

15. The method according to claim 11, wherein when the returned reserving mail is re-transmitted, a message indicating re-transmission of the returned reserving mail is displayed in the first partial field, a bottom side of the first partial field being adjacent to a top side of the second partial field.

16. The method according to claim 11, wherein normal transmission or reserved transmission is selected after displaying the editing screen for editing the returned reserving mail.

* * * * *

UNITED STATES PATENT AND TRADEMARK OFFICE
CERTIFICATE OF CORRECTION

| | | |
|---|---|---|
| PATENT NO. | : 7,712,040 B2 | Page 1 of 1 |
| APPLICATION NO. | : 11/373980 | |
| DATED | : May 4, 2010 | |
| INVENTOR(S) | : Susumu Aoyama | |

It is certified that error appears in the above-identified patent and that said Letters Patent is hereby corrected as shown below:

Column 15, Line 36, change "in an" to --if an--.

Signed and Sealed this

Seventeenth Day of August, 2010

David J. Kappos
*Director of the United States Patent and Trademark Office*